US012458922B2

(12) United States Patent
Rogers et al.

(10) Patent No.: US 12,458,922 B2
(45) Date of Patent: Nov. 4, 2025

(54) ELECTROACTIVE SPECIES AND METHOD FOR ELECTROCHEMICAL GAS SEPARATION

(71) Applicant: Verdox, Inc, Woburn, MA (US)

(72) Inventors: Cameron Rogers, Malden, MA (US); Sahag Voskian, Boston, MA (US); Alexander Reath, Melrose, MA (US)

(73) Assignee: Verdox, Inc., Woburn, MA (US)

( * ) Notice: Subject to any disclaimer, the term of this patent is extended or adjusted under 35 U.S.C. 154(b) by 628 days.

(21) Appl. No.: 17/851,318

(22) Filed: Jun. 28, 2022

(65) Prior Publication Data
US 2023/0012689 A1    Jan. 19, 2023

Related U.S. Application Data

(60) Provisional application No. 63/215,619, filed on Jun. 28, 2021.

(51) Int. Cl.
*B01D 53/32* (2006.01)
*C07C 50/04* (2006.01)
*C07C 50/12* (2006.01)
*C07C 50/18* (2006.01)

(52) U.S. Cl.
CPC .......... *B01D 53/326* (2013.01); *C07C 50/04* (2013.01); *C07C 50/12* (2013.01); *C07C 50/18* (2013.01); *B01D 2253/206* (2013.01)

(58) Field of Classification Search
CPC .......... B01D 53/326; B01D 2253/206; C07C 50/04; C07C 50/12; C07C 50/18; C07C 50/32; Y02C 20/40; C07D 213/74; C07F 1/02
See application file for complete search history.

(56) References Cited

U.S. PATENT DOCUMENTS

| | | | |
|---|---|---|---|
| 10,464,018 B2 | 11/2019 | Voskian et al. | |
| 10,744,457 B2 | 8/2020 | Perry | |
| 11,219,858 B2 | 1/2022 | Voskian et al. | |
| 11,298,653 B2 | 4/2022 | Voskian et al. | |
| 2006/0081482 A1 | 4/2006 | Tempel et al. | |
| 2007/0287812 A1 | 12/2007 | McDermott et al. | |
| 2008/0083606 A1 | 4/2008 | Volland et al. | |
| 2017/0113182 A1 | 4/2017 | Voskian et al. | |

(Continued)

FOREIGN PATENT DOCUMENTS

WO    2021041732 A1    3/2021

OTHER PUBLICATIONS

International Search Report for the corresponding International Application No. PCT/US2022/035209; International Filing Date: Jun. 28, 2022; Date of Mailing: Oct. 26, 2022; 2 pages.

(Continued)

*Primary Examiner* — Dung H Bui
(74) *Attorney, Agent, or Firm* — Stites & Harbison, PLLC

(57) ABSTRACT

An electroactive species includes a quinone core structure and at least one stabilizing group covalently bound thereto. The stabilizing group includes a cationic group, a hydrogen bond donor, or a combination thereof. The electroactive species has an oxidized state and at least one reduced state capable of bonding with a Lewis acid gas to form an anion adduct. Methods for separating a Lewis acid gas from a fluid mixture, electrochemical cells, and gas separation systems are also provided.

34 Claims, 3 Drawing Sheets

(56) References Cited

U.S. PATENT DOCUMENTS

| | | |
|---|---|---|
| 2018/0028962 A1 | 2/2018 | Hatton et al. |
| 2021/0060484 A1 | 3/2021 | Aziz et al. |
| 2021/0060485 A1 | 3/2021 | Voskian et al. |
| 2021/0062351 A1 | 3/2021 | Voskian et al. |
| 2021/0238212 A1* | 8/2021 | Derrick .................. C25B 1/23 |
| 2021/0387139 A1 | 12/2021 | Voskian et al. |
| 2022/0040632 A1 | 2/2022 | Voskian et al. |
| 2022/0184552 A1 | 6/2022 | Voskian et al. |
| 2024/0173668 A1 | 5/2024 | Voskian et al. |

OTHER PUBLICATIONS

Written Opinion for the corresponding International Application No. PCT/US2022/035209; International Filing Date: Jun. 28, 2022; Date of Mailing: Oct. 26, 2022; 6 pages.

Dubois, D. L. et al., "Electrochemical Concentration of Carbon Dioxide," Electrochemical and Electrocatalytic Reactions of Carbon dioxide, Chapter 4 (edited by Sullivan et al., Elsevier, 1993); 25 pages.

Azcarate, I. et al., "Through-Space Charge Interaction Substituent Effects in Molecular Catalysis Leading to the Design of the Most Efficient Catalyst of CO2-to-CO Electrochemical Conversion," J. Am. Chem. Soc., vol. 138, 2016; pp. 16639-16644.

Chabolla, S. A. et al., "For CO2 Reduction, Hydrogen-Bond Donors do the Trick," ACS Central Science, vol. 4, 2018; pp. 315-317.

Dey, S. et al., "Activation of Co(I) State in a Cobalt-Dithiolato Catalyst for Selective and Efficient CO2 Reduction to CO," Inorganic Chemistry, vol. 57, 2018; pp. 5939-5947.

Dubois, D. L. et al., "Electrochemical Concentration of Carbon Dioxide," Solar Energy Research Institute, Chapter 4; pp. 94-117, 1993.

Fachinetti et al., "Bifunctional Activation of Carbon Dioxide. Synthesis and Structure of a Reversible COz Carrier," Journal of the American Chemical Society, 100:23, 1978; pp. 7405-7407.

Fachinetti, G. et al., "Bifunctional Model Complexes Active in Carbon Dioxide Fixation: Synthesis and X-ray Structure of Bimetallic Cobalt(I)-Alkali Cation-Schiff Base Complexes," Inorganic Chemistry, vol. 18, No. 12, 1979; pp. 3469-3475.

Floriani, C. et al., "Sodium [NN'-Ethylenebis(salicylideneiminato)cobaltate(I)], a Reversible Carbon Dioxide Carrier," J.C.S. Chem. Comm., 1974; pp. 615-616.

Gurkan, B. et al., "Quinone Reduction in Ionic Liquids for Electrochemical CO2 Separation," ACS Sustainable Chem. Eng., vol. 3, 2015; pp. 1394-1405.

Liu et al., "Electrochemically mediated carbon dioxide separation with quinone chemistry in salt-concentrated aqueous media," Supplementary Information; 27 pages.

Liu, Y. et al., "Electrochemically mediated carbon dioxide separation with quinone chemistry in salt-concentrated aqueous media," Nature Communications, 11:2278, 2020; pp. 1-11.

Mizen, M. B. et al., "Reductive Addition of CO2 to 9,10-Phenanthrenequinone," Journal of the Electrochemical Society, vol. 136, No. 4, 1989; 7 pages.

Scovazzo, P. et al., "Electrochemical Separation and Concentration of <1% Carbon Dioxide from Nitrogen," Journal of the Electrochemical Society, vol. 150, No. 5, 2003; 9 pages.

Staley, P. A., "The Electrochemistry of Quinones in Aprotic Solvents," UC San Diego Electronic Theses and Disseratitions, Date of Publication: 2016; 185 pages.

Voskian, S. et al., "Faradaic electro-swing reactive adsorption for CO2 capture," Energy Environ. Sco., vol. 12, 2019; 18 pages.

Yin, W. et al., "Electrochemical Reduction of CO 2 Mediated by Quinone Derivatives: Implication for Li—CO 2 Battery," Journal of Physical Chemistry C, American Chemical Society, vol. 122, No. 12, 2018; pp. 6546-6554.

\* cited by examiner

ELECTROACTIVE SPECIES AND METHOD FOR ELECTROCHEMICAL GAS SEPARATION

CROSS REFERENCE TO RELATED APPLICATION

This application claims priority to U.S. Provisional Patent Application No. 63/215,619, filed on Jun. 28, 2021, in the United States Patent and Trademark Office, and all the benefits accruing therefrom under 35 U.S.C. § 119, the content of which is incorporated herein in its entirety by reference

BACKGROUND

Removing target species from fluid mixtures has been the subject of much research and development. For example, there have been efforts to mitigate global warming by curbing carbon dioxide emissions. To this end, a number of approaches have been explored, including thermal methods, to capture carbon dioxide at different stages of its production. Other potential applications of Lewis acid gas removal include removing Lewis acid gases directly from air or ventilated air.

Electroswing adsorption is an alternative method of capturing a Lewis acid gas from a gaseous mixture. In an electroswing adsorption cell, the electrode includes an electrically conductive scaffold, such as carbon fiber paper, which serves several functions including providing a conduction path for electrons, a surface area for an active material to interface with the electrolyte, and mechanical support to maintain a porous structure.

There remains a continuing need for improved materials and methods for capturing a target species from a fluid mixture. It would be advantageous to provide improved materials for capturing a target Lewis acid gas in the presence of other gases, and particularly in the presence of redox active gases such as dioxygen.

SUMMARY

Provided is an electroactive species comprising a quinone core structure and at least one stabilizing group covalently bound thereto; wherein the stabilizing group comprises a cationic group, a hydrogen bond donor, or a combination thereof; wherein the electroactive species comprises an oxidized state, and at least one reduced state capable of bonding with a Lewis acid gas to form an anion adduct between the Lewis acid gas and the reduced electroactive species; and wherein the presence of the stabilizing group kinetically favors forming the anion adduct from the reduced electroactive species and the Lewis acid gas, or thermodynamically favors forming the anion adduct in a thermodynamic equilibrium between the anion adduct and the reduced electroactive species, or kinetically favors forming the anion adduct from the reduced electroactive species and thermodynamically favors the forming of the anion adduct in the thermodynamic equilibrium between the anion adduct and the reduced electroactive species.

Also provided is a polymer or oligomer wherein at least a portion of the repeating units comprise the electroactive species.

A method for separating a Lewis acid gas from a fluid mixture comprising the Lewis acid gas is also described, the method comprising: contacting the fluid mixture with the electroactive species or the polymer or oligomer, wherein the electroactive species is in a reduced state, to form an anion adduct between the Lewis acid gas and the electroactive species in the reduced state.

Also provided is an electrochemical apparatus comprising a chamber comprising a negative electrode in electronic communication with an electroactive species in a reduced state, and a non-aqueous electrolyte, wherein the chamber is configured to receive a fluid mixture comprising a Lewis acid gas, wherein the electroactive species comprises a quinone core and at least one stabilizing group covalently bound thereto; wherein the stabilizing group comprises a cationic group, a hydrogen bond donor, or a combination thereof; and wherein the electroactive species comprises an oxidized state, and at least one reduced state capable of bonding with a Lewis acid gas to form an anion adduct between the Lewis acid gas and the reduced electroactive species; and wherein the presence of the stabilizing group: kinetically favors the forming the anion adduct from the reduced electroactive species and the Lewis acid gas, or thermodynamically favors forming the anion adduct in a thermodynamic equilibrium between the anion adduct and the reduced electroactive species, or kinetically favors forming the anion adduct from the reduced electroactive species and thermodynamically favors the forming of the anion adduct in the thermodynamic equilibrium between the anion adduct and the reduced electroactive species.

Also provided is a gas separation system, comprising a plurality of electrochemical cells in fluid communication with a gas inlet and a gas outlet, wherein each of the plurality of electrochemical cells comprises: a first electrode comprising an electroactive species in a reduced state wherein the electroactive species comprises an oxidized state and at least one reduced state which bonds with a Lewis acid gas to form an anion adduct; a second electrode comprising a complementary electroactive layer; a first separator between the first electrode and the second electrode; and a non-aqueous electrolyte; wherein the electroactive species comprises a quinone core and at least one stabilizing group covalently bound thereto; wherein the stabilizing group comprises a cationic group, a hydrogen bond donor, or a combination thereof; and wherein the presence of the stabilizing group: kinetically favors the forming the anion adduct from the reduced electroactive species and the Lewis acid gas, or thermodynamically favors forming the anion adduct in a thermodynamic equilibrium between the anion adduct and the reduced electroactive species, or kinetically favors forming the anion adduct from the reduced electroactive species and thermodynamically favors the forming of the anion adduct in the thermodynamic equilibrium between the anion adduct and the reduced electroactive species.

The above described and other features are exemplified by the following figures and detailed description.

BRIEF DESCRIPTION OF THE DRAWINGS

The following figures are exemplary embodiments.

DETAILED DESCRIPTION

Figure 1:
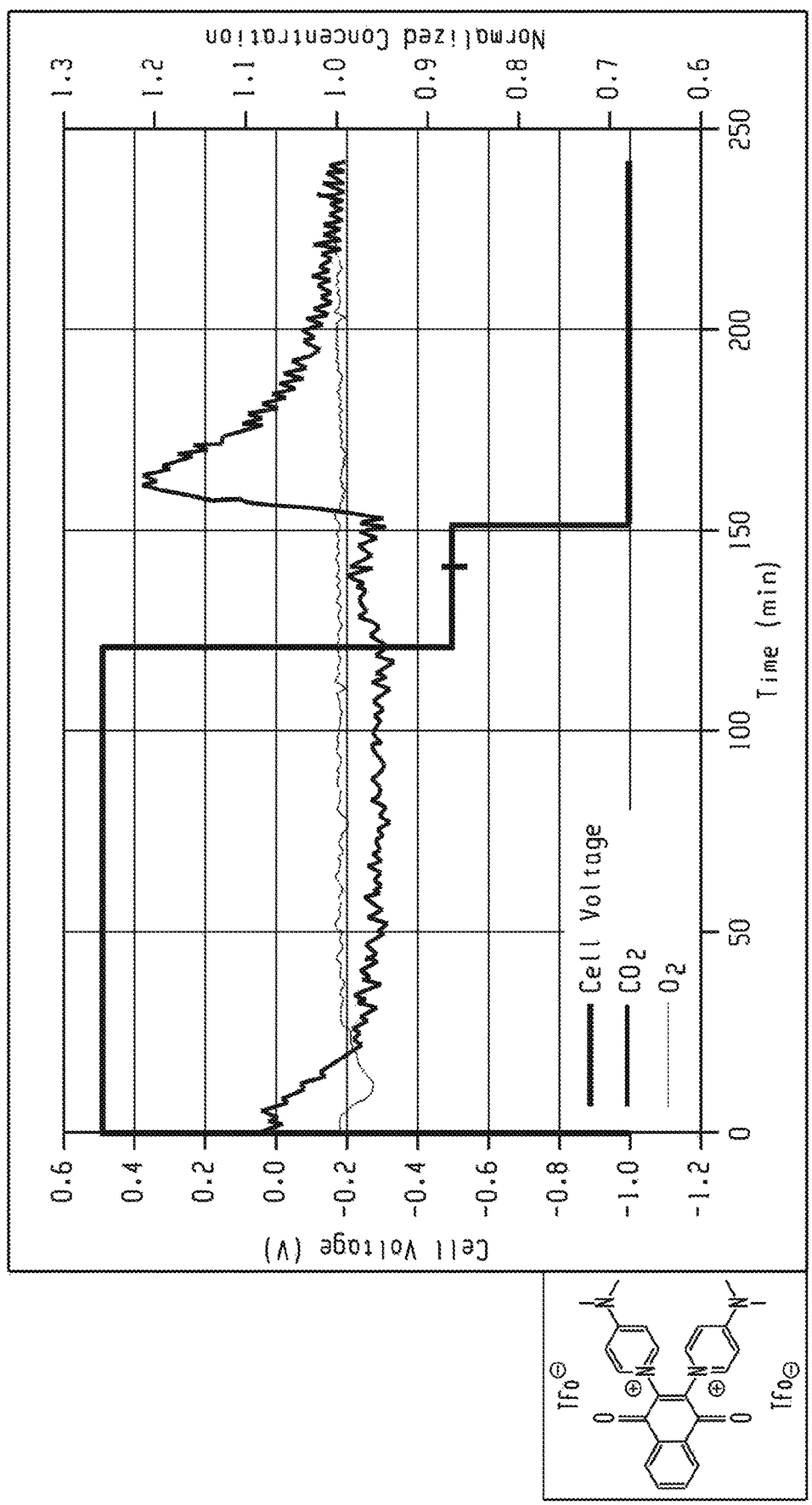
FIG. 1 shows the chemical structure of a 4-dimethylaminopyridine-functionalized naphthoquinone (NQ-DMAP) and a graph of cell voltage (Volts, V) and normalized concentration versus time (minutes, min) during operation of an electrochemical cell as described in Example 1.

The present disclosure is directed to an electroactive species, a method, an apparatus, and a system for the separation of one or more Lewis acid gases from a fluid mixture. The electroactive species is covalently attached to a stabilizing group or moiety (e.g., with the stabilizing group directly attached to a quinone core or with the stabilizing group covalently bound to the same polymer chain as the quinone core, but necessarily directly to the quinone core, as further described in detail below). When the electroactive species is in a reduced state (i.e., "reduced electroactive species"), it may be contacted with a fluid mixture to capture one or more selected Lewis acid gases (e.g., $CO_2$) from the components of the fluid mixture. The presence of the stabilizing group on the electroactive species may be kinetically favorable to the formation of an anion adduct between one or more Lewis acid gases and the reduced electroactive species. In some instances, the presence of the stabilizing group on the reduced electroactive species may be thermodynamically favorable to the formation of an anion adduct between one or more Lewis acid gases and the reduced electroactive species. Advantageously, the presence of the stabilizing group on the electroactive species can be both kinetically favorable to and thermodynamically favorable to the formation of an anion adduct between one or more Lewis acid gases and the reduced electroactive species. In some aspects, being "favorable to the formation of an anion adduct between one or more Lewis acid gases and a reduced electroactive species" may be used in a relative sense to mean being more favorable than to the formation of an anion adduct between the same Lewis acid gases and a comparable electroactive species that does not include the stabilizing group. In some aspects, being "favorable to the formation of an anion adduct between one or more Lewis acid gases and a reduced electroactive species" may be used in a relative sense to mean being more favorable than to the formation of an anion adduct between the same Lewis acid gases and a comparable electroactive species that does not include the stabilizing group and having a reduction potential similar to that of the electroactive species comprising the stabilizing group.

Accordingly, an aspect of the present disclosure is an electroactive species comprising a quinone core structure and at least one stabilizing group covalently bound thereto. As used herein, an "electroactive species" refers to a material that undergoes oxidation or reduction upon exposure to an electrical potential in an electrochemical cell. The electroactive species is capable of bonding with or binding to a Lewis acid gas when the electroactive species is in a reduced state and releasing the Lewis acid gas when the electroactive species is in an oxidized state. Accordingly, the electroactive species includes an oxidized state and at least one reduced state, and a reduced electroactive species bonds with the Lewis acid gas to form an anion adduct. As used herein, "an anion adduct" refers to a reduced electroactive species that is bonded with a Lewis acid gas.

Subsequent oxidation of the electroactive species may release the Lewis acid gas, and the corresponding method may provide for reversible capture of the Lewis acid gas, such as for reversible carbon capture in the case of $CO_2$.

The electroactive species of the present disclosure comprises a quinone core structure. As used herein, the term "quinone core structure" refers to a fully conjugated cyclic dione structure. For example, the quinone core structure can be of formula (I) or (II)

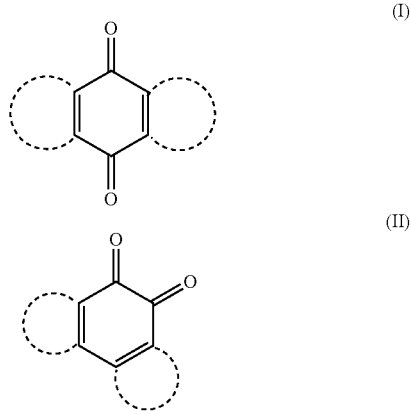

where the dashed lines indicate the optional presence of additional groups, preferably aromatic groups. It will be understood that when present, the additional aromatic group(s) (represented by the dashed lines in formulas (I) and (II)) are considered to be part of the quinone core structure, and therefore are encompassed by the term "quinone core structure" as used herein. The carbonyl groups of the quinone core structure can be reduced in the manner shown below, with a one electron reduction to form a semiquinone anion (IA) or (IIA), respectively, and a subsequent one electron reduction of the semiquinone anion to form a quinone dianion (IB) or (IIB), respectively.

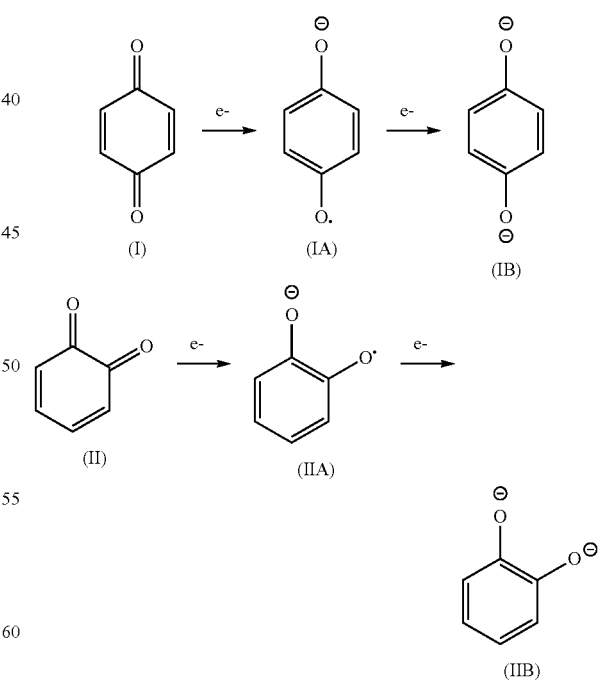

When the Lewis acid gas is $CO_2$, an anion adduct having the formula: $(Q\text{-}CO_2)^{\cdot-}$ may be formed between the semiquinone anion and $CO_2$, as shown below for the exemplary case of semiquinone anion (IA):

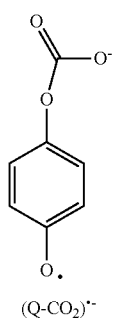 [SMILES: O=C([O-])Oc1ccc(O)cc1]

(Q-CO₂)·⁻

When the Lewis acid gas is CO₂, an anion adduct (Q-(CO₂)₂)²⁻) may be formed between the quinone dianion and CO₂, as shown below for the exemplary case of the quinone dianion (IB):

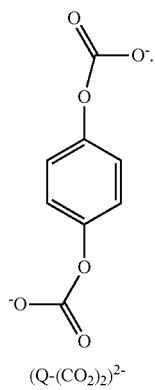

(Q-(CO₂)₂)²⁻

In some aspects, the anion adduct formed between a quinone core and CO₂ includes an anion adduct (Q-CO₂)⁻), an anion adduct (Q-(CO₂)₂)²⁻), or a combination thereof.

In an aspect, the quinone core structure can include, for example, 1,2-benzoquinone, 1,4-benzoquinone, 1,4-naphthoquinone, 1,2-naphthoquinone, anthraquinone, phenanthrenequinone, benzanthraquinone, dibenzoanthraquinone, 4,5,9,10-pyrenetetrone, or the like, or a combination thereof.

The electroactive species comprises at least one stabilizing group A covalently bound to the quinone core structure through a linking group -(L)$_z$-. The combination of the stabilizing group and linker (-(L)$_z$-A) can be collectively referred to herein as "R$^x$" for simplicity. The stabilizing group A is independently at each occurrence a cationic group, a hydrogen bond donor, or a combination thereof and L is a linking group. Linking group L can be a substituted or unsubstituted C$_{1-6}$ alkylene group, a substituted or unsubstituted C$_{6-20}$ aryl group, a substituted or unsubstituted C$_{2-3}$ alkylene glycol ether group, a substituted or unsubstituted C$_{2-3}$ alkylene diamine group (e.g., ethylene diamine or propylene diamine), a substituted or unsubstituted poly(C$_{2-3}$ alkylene glycol ether) group, or a substituted or unsubstituted poly(C$_{2-3}$ alkylene diamine) group. In the formula -(L)$_z$-A, z is 0 or 1, provided that z is 1 when A is the hydrogen bond donor. In an aspect, the linking group L is an unsubstituted C$_{1-6}$ alkylene group or an unsubstituted C$_{6-20}$ aryl group.

For example, the electroactive species can be of structure (Ic) or (IIc)

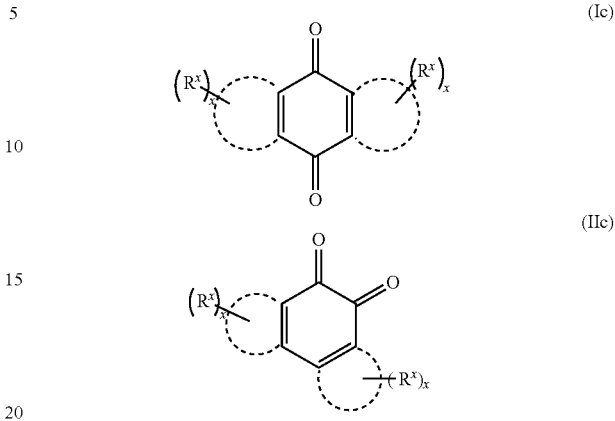

wherein in the foregoing formulas, each R$^x$ is independently at each occurrence the group -(L)$_z$-A as described above, and x is independently at each occurrence 0 to 4, provided that at least one occurrence of x is 1 (i.e., there is at least one R$^x$ group attached to the quinone core) and that the valence of the quinone core is not exceeded. It will be understood that when one or both of the optional groups indicated by the dashed lines are not present, then the group R$^x$ can be bonded to at least one carbon atom of the benzoquinone group.

Cationic stabilizing groups can include, for example, a substituted or unsubstituted C$_{1-6}$ alkyl ammonium group, a substituted or unsubstituted C$_{1-6}$ alkyl phosphonium group, a substituted or unsubstituted benzyl ammonium group, a chelated metal cation, a substituted or unsubstituted anilinium group, a substituted or unsubstituted pyridinium group, or a substituted or unsubstituted imidazolium group. In some aspects, the cationic group can be a substituted or unsubstituted C$_{1-6}$ alkyl ammonium group, a substituted or unsubstituted benzyl ammonium group, a substituted or unsubstituted pyridinium group, or a substituted or unsubstituted imidazolium group. In aspects wherein the cationic stabilizing group is a chelated metal cation, the metal cation can be chelated by linking groups "L" which are covalently bound to the quinone core. As used herein, "a chelated metal cation" refers to a chelate complex between a chelating ligand and a cationic metal chelate. It is to be understood that when the cationic stabilizing group is the chelated metal cation, the group A in the formula -(L)$_z$-A includes both the chelating ligand and the cationic metal chelate. For example, the cationic stabilizing group can be a chelated metal cation, wherein group A includes a cationic metal chelate and a chelating group such as a crown ether, an aza-crown ether, or the like, that is bound to the quinone core through linking group L.

As used herein, the term "hydrogen-bond donor" refers to a compound capable of being a hydrogen bond donor to a hydrogen bond acceptor. Hydrogen bonding refers to the interaction of a hydrogen atom from a molecular or a molecular fragment X-H in which X is more electronegative than H (the "hydrogen bond donor") and an atom or a group of atoms in the same or a different molecule (the "hydrogen bond acceptor"). See, e.g., Arunan et al. "Definition of the hydrogen bond", Pure and Appl. Chem., 83(8): 1637-1641 (2011), the contents of which are incorporated by reference herein in its entirety. In the case of the anion adduct, which is a hydrogen bond acceptor, the hydrogen bond donor species stabilizes the anion adduct. In some aspects, the hydrogen-bond strength between a hydrogen atom of the hydrogen-bond donor and the anion adduct is greater than a hydrogen-bond strength between the hydrogen atom of the hydrogen-bond donor and the semiquinone anion or the quinone dianion.

Hydrogen bond donors can include, for example, a hydroxyl group, a carboxylic acid group, an amine group, an aniline group, an amide group, or a thiol group. In some aspects, the hydrogen bond donor is a hydroxyl group.

The electroactive species comprises at least one stabilizing group, but may, in some aspects, comprise up to eight stabilizing groups, or up to four stabilizing groups. One of ordinary skill, with the benefit of this disclosure, would understand how to determine how many stabilizing groups are suitable for the electroactive species based on, for example, synthetic feasibility, resulting reduction potential, and the number of sites on the quinone core available for substitution.

In some aspects, the electroactive species can be according to structure (III), (IV), or (V), or a combination thereof

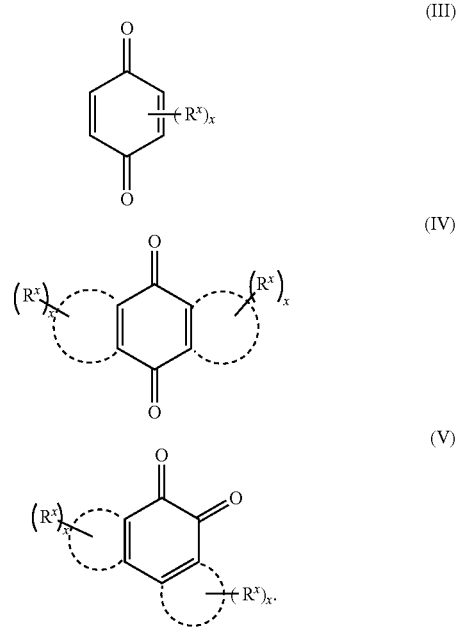

In each of structures (III) to (V), each $R^x$ is independently at each occurrence the group of the formula $-(L)_z-A$, wherein L, A, z and x are as defined above.

In an aspect, the electroactive species can be of structure (VI)

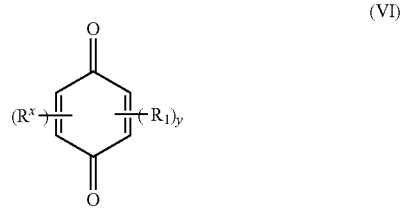

wherein each R¹ is independently at each occurrence hydrogen, halogen (e.g., chloro, bromo, iodo), a substituted or unsubstituted $C_{1-30}$ alkyl group, a substituted or unsubstituted $C_{1-30}$ alkoxy group, a poly($C_{1-30}$ alkylene oxide) group; a substituted or unsubstituted $C_{3-30}$ cycloalkyl group, a substituted or unsubstituted $C_{3-30}$ branched alkyl group, a substituted or unsubstituted $C_{6-30}$ aryl group, a substituted or unsubstituted $C_{2-30}$ heteroaryl group, a substituted or unsubstituted $C_{1-30}$ fluoroalkyl group, a nitrile group, a nitro group, a thiol group, or a vinyl group, optionally wherein any adjacent R¹ groups can form a cyclic group together; each $R^x$ is independently at each occurrence the group $-(L)_z-A$; x is 1 to 4, and y is 0 to 3, provided that the sum of x and y is 4.

In an aspect, the electroactive species can be of structure (VII)

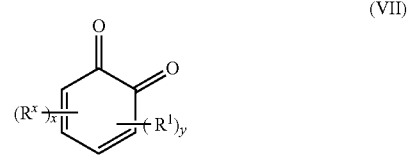

wherein each R¹ is independently at each occurrence hydrogen, halogen, a substituted or unsubstituted $C_{1-30}$ alkyl group, a substituted or unsubstituted $C_{1-30}$ alkoxy group, a poly($C_{1-30}$ alkylene oxide) group; a substituted or unsubstituted $C_{3-30}$ cycloalkyl group, a substituted or unsubstituted $C_{3-30}$ branched alkyl group, a substituted or unsubstituted $C_{6-30}$ aryl group, a substituted or unsubstituted $C_{2-30}$ heteroaryl group, a substituted or unsubstituted $C_{1-30}$ fluoroalkyl group, a nitrile group, a nitro group, a thiol group, or a vinyl group, optionally wherein any two or more adjacent R¹ groups can form a cyclic group together; each $R^x$ is independently at each occurrence the group $-(L)_z-A$; x is 1 to 4, and y is 0 to 3, provided that the sum of x and y is 4.

In an aspect, the electroactive species can be of structure (VIII)

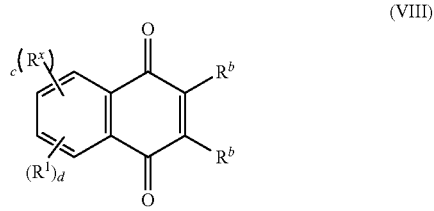

wherein each R¹ is independently at each occurrence hydrogen, halogen, a substituted or unsubstituted $C_{1-30}$ alkyl group, a substituted or unsubstituted $C_{1-30}$ alkoxy group, a poly($C_{1-30}$ alkylene oxide) group; a substituted or unsubstituted $C_{3-30}$ cycloalkyl group, a substituted or unsubstituted $C_{3-30}$ branched alkyl group, a substituted or unsubstituted $C_{6-30}$ aryl group, a substituted or unsubstituted $C_{2-30}$ heteroaryl group, a substituted or unsubstituted $C_{1-30}$ fluoroalkyl group, a nitrile group, a nitro group, a thiol group, or a vinyl group, optionally wherein any adjacent R¹ groups can form a cyclic group together; each $R^x$ is independently at each occurrence the group $-(L)_z-A$; each $R^b$ is independently at each occurrence R¹ or $R^x$; and c and d are independently at each 0 to 4, provided that the sum of c and d is 4, and provided that when c is 0, at least one of $R^b$ is $R^x$.

In a specific aspect, the electroactive species can be of structure (VIII) wherein c is 0, d is 4, and at least one occurrence of $R^b$ is $-(L)_z-A$ wherein L is a substituted or unsubstituted phenyl group and z is 1, and the electroactive species is of the structure (VIIIa)

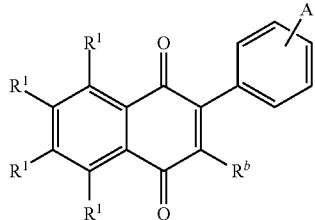
(VIIIa)

preferably wherein A is a —NR²R³R⁴ ammonium group or a —PR²R³R⁴ phosphonium group, wherein $R^2$, $R^3$ and $R^4$ are independently at each occurrence a substituted or unsubstituted $C_{1-6}$ alkyl group or a substituted or unsubstituted benzyl group, or a hydroxyl group; each R¹ is independently at each occurrence hydrogen, halogen, a substituted or unsubstituted $C_{1-30}$ alkyl group, a substituted or unsubstituted $C_{1-30}$ alkoxy group, a poly($C_{1-30}$ alkylene oxide) group; a substituted or unsubstituted $C_{3-30}$ cycloalkyl group, a substituted or unsubstituted $C_{3-30}$ branched alkyl group, a substituted or unsubstituted $C_{6-30}$ aryl group, a substituted or unsubstituted $C_{2-30}$ heteroaryl group, a substituted or unsubstituted $C_{1-30}$ fluoroalkyl group, a nitrile group, a nitro group, a thiol group, or a vinyl group, optionally wherein any adjacent $R^1$ groups can form a cyclic group together, preferably wherein each occurrence of $R^1$ is hydrogen; and $R^b$ is $R^1$ or $R^x$. While the aryl linking group of the exemplary embodiment according to structure (VIIIa) is shown as an unsubstituted aryl group, substituted groups are also contemplated by the present disclosure.

In an aspect, the electroactive species can be of structure (VIII) wherein c is 0, d is 4, and both occurrences of $R^b$ are -(L)$_z$-A wherein L is a substituted or unsubstituted phenyl group and z is 1, and the electroactive species is of the structure (VIIIb)

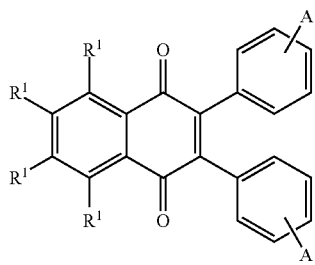
(VIIIb)

wherein $R^1$ and A are as described above, preferably wherein each occurrence of $R^1$ is hydrogen, and each occurrence of A is a —NR²R³R⁴ ammonium group, preferably, wherein each of $R^2$, $R^3$ and $R^4$ are methyl. While the aryl linking groups of the exemplary embodiment according to structure (VIIIb) are shown as unsubstituted aryl groups, substituted groups are also contemplated by the present disclosure.

In an aspect, the electroactive species can be of structure (VIII) wherein c is 0, d is 4, $R^1$ is as described above, preferably hydrogen, and at least one occurrence of $R^b$ is -(L)$_z$-A wherein z is 0, A is a substituted or unsubstituted pyridinium group, and $R^b$ is $R^1$ or $R^x$, and the electroactive species is of the structure (VIIIc)

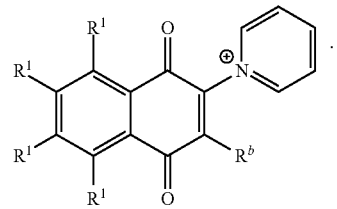
(VIIIc)

While the pyridinium in the exemplary embodiment according to structure (VIIIc) is shown as an unsubstituted pyridinium group, substituted groups are also contemplated by the present disclosure.

In some aspects of structure (VIIIc), the remaining $R^b$ group can be of the formula -(L)z-A wherein z is 0, and A is a substituted or unsubstituted pyridinium group. In some aspects of structure (VIIIc), $R^b$ is $R^1$, preferably a substituted or unsubstituted phenyl group. In some aspects, the pyridinium group can be a substituted pyridinium group, for example a 4-(dimethylamino)pyridinium group.

In an aspect, the electroactive species can be of structure (VIII) wherein c is 0, d is 4, $R^1$ is as described above, preferably hydrogen, and at least one occurrence of $R^b$ is -(L)z-A wherein z is 0, A is a substituted or unsubstituted pyridinium group which is bound to the quinone core via the $C_2$, $C_3$, or $C_4$ positions, $R^b$ is $R^1$ or $R^x$, and $R^a$ is wherein $R^a$ is a substituted or unsubstituted $C_{1-6}$ alkyl group, preferably a methyl group, and the electroactive species is of the structure (VIIId)

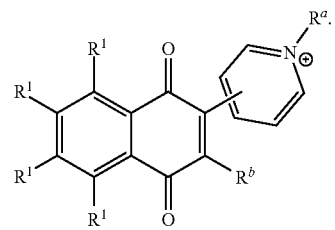
(VIIId)

In an aspect, the electroactive species can be of structure (VIII) wherein c is 0, d is 4, $R^1$ is as described above, preferably hydrogen, and at least one occurrence of $R^b$ is -(L)z-A wherein z is 0, A is a substituted or unsubstituted imidazolium group, and $R^b$ is $R^1$ or $R^x$, and the electroactive species is of the structure (VIIIe)

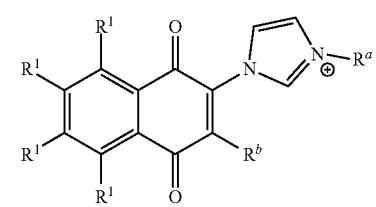
(VIIIe)

wherein $R^a$ is a substituted or unsubstituted $C_{1-6}$ alkyl group, preferably a methyl group, or a substituted or unsubstituted benzyl group. In some aspects of structure (VIIIe), $R^b$ can be a group of the formula -(L)z-A wherein z is 0, and A is a substituted or unsubstituted imidazolium group.

In an aspect, the electroactive species can be of structure (VIII) wherein c is 2, d is 2, $R^b$ is independently at each occurrence hydrogen or phenyl, and the electroactive species is of the formula (VIIIf-h)

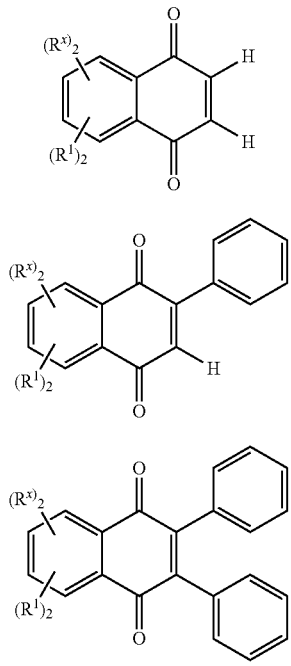

(VIIIf)

(VIIIg)

(VIIIh)

wherein each occurrence of $R^x$ is $-(L)_z-A$, preferably wherein z is 0 and A is a $—NR^2R^3R^4$ ammonium group, wherein $R^2$, $R^3$ and $R^4$ are independently at each occurrence a substituted or unsubstituted $C_{1-6}$ alkyl group or a substituted or unsubstituted benzyl group, or a hydroxyl group; preferably, wherein the $R^x$ groups are positioned para relative to one another (i.e., at the 5 and 8 positions of the naphthoquinone core); and Riis independently at each occurrence hydrogen, halogen, a substituted or unsubstituted $C_{1-30}$ alkyl group, a substituted or unsubstituted $C_{1-30}$ alkoxy group, a poly($C_{1-30}$ alkylene oxide) group; a substituted or unsubstituted $C_{3-30}$ cycloalkyl group, a substituted or unsubstituted $C_{6-30}$ aryl group, a substituted or unsubstituted $C_{2-30}$ heteroaryl group, a nitrile group, a nitro group, a thiol group, or a vinyl group, preferably hydrogen, optionally wherein any adjacent $R^1$ groups can form a cyclic group together. In an aspect, the $C_{1-30}$ alkyl group can include $C_{3-30}$ branched alkyl groups. In an aspect, the $C_{1-30}$ alkyl group can be substituted and can comprise, for example, a $C_{1-30}$ fluoroalkyl group.

In an aspect, the electroactive species can be of structure (VIII) wherein c is 0, d is 4, $R^1$ is as described above, preferably hydrogen, and at least one occurrence of $R^b$ is $-(L)_z-A$ wherein z is 1, L is a substituted or unsubstituted $C_{1-8}$ alkyl group or a oligo($C_{2-3}$ alkylene glycol) group, and A is a chelated metal cation, for example a Group 1 element, a Group 2 element, a rare earth element, a Group 11 element, a Group 12 element, a Group 13 element, or a combination thereof, preferably wherein the metal cation is Li, Ca, Sc, La, Al, Zn, Mg, Na, K, or a combination thereof, chelated by a crown ether (e.g., 12-crown-4, 15-crown-5, 18-crown-6, and the like, or an aza-crown ether), and the electroactive species is of formula (VIIIi)

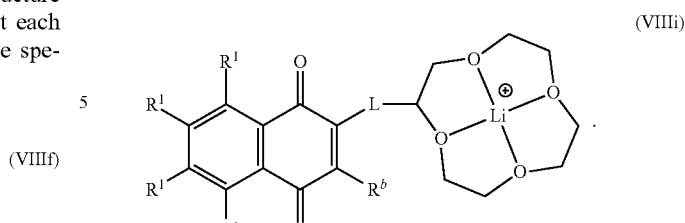

(VIIIi)

While the structure of formula (VIIIi) is shown lithium as the chelated metal cation, it will be understood that any of the aforementioned metal cations can be used. Particular crown ether/metal cation combinations can be selected by the skilled person without undue experimentation using the guidance provided by the present disclosure.

In an aspect, the electroactive species can be of structure (IX)

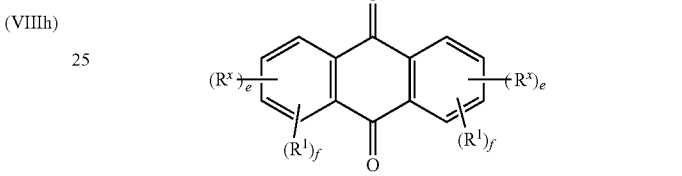

(IX)

wherein $R^1$ is independently at each occurrence hydrogen, halogen, a substituted or unsubstituted $C_{1-30}$ alkyl group (including, e.g., $C_{3-30}$ branched alkyl groups, $C_{1-30}$ fluoroalkyl group, and the like), a substituted or unsubstituted $C_{1-30}$ alkoxy group, a poly($C_{1-30}$ alkylene oxide) group; a substituted or unsubstituted $C_{3-30}$ cycloalkyl group, a substituted or unsubstituted $C_{6-30}$ aryl group, a substituted or unsubstituted $C_{2-30}$ heteroaryl group, a nitrile group, a nitro group, a thiol group, or a vinyl group, optionally wherein any adjacent $R^1$ groups can form a cyclic group together; $R^x$ is independently at each occurrence the group $-(L)_z-A$; e is independently at each occurrence 0 to 4, provided that at least one occurrence of e is 1, and f is independently at each occurrence 0 to 4, provided that the valence of each phenyl group of the anthraquinone is not exceeded (e.g., each e/f pair sums to 4). In an aspect, each occurrence of e is 1.

In an aspect of structure (IX), each occurrence of e is 1 (i.e., the total e is 2), each occurrence of f is 3 (i.e., the total f is 6), each occurrence of $R^x$ is $-(L)_z-A$, preferably wherein A is a $—NR^2R^3R^4$ ammonium group, wherein $R^2$, $R^3$ and $R^4$ are independently at each occurrence a substituted or unsubstituted $C_{1-6}$ alkyl group or a substituted or unsubstituted benzyl group, or a hydroxyl group, an amine group, an amide group, or a thiol group, preferably a hydroxyl group, and each occurrence of $R^1$ can be hydrogen. For example, the electroactive species can be of structure (IXa)

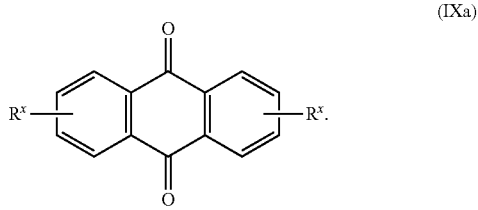

(IXa)

In an aspect, A is the —NR²R³R⁴ ammonium group, preferably, wherein each of R², R³ and R⁴ are methyl or R² and R³ are methyl and R⁴ is benzyl; and R¹ is hydrogen.

In an aspect, the electroactive species can be according to structure (IX) and the stabilizing group can be a chelated metal. For example, each occurrence of e is 2, each occurrence of f is 2, each occurrence of $R^x$ is -(L)$_z$-A wherein z is 1 and L is an alkylene ether or an alkylene diamine linking group. In some aspects, when the linking group L is a $C_{2-3}$ alkylene glycol ether group, a $C_2$-3 alkylene diamine group, a poly($C_{2-3}$ alkylene glycol ether) group, or a poly($C_{2-3}$ alkylene diamine) group, the stabilizing group A is a cationic group, specifically a chelated metal cation E. In an aspect, when e is 2, the $R^x$ groups can be positioned ortho to one another. In an aspect, the electroactive species can be according to structure (IXb)

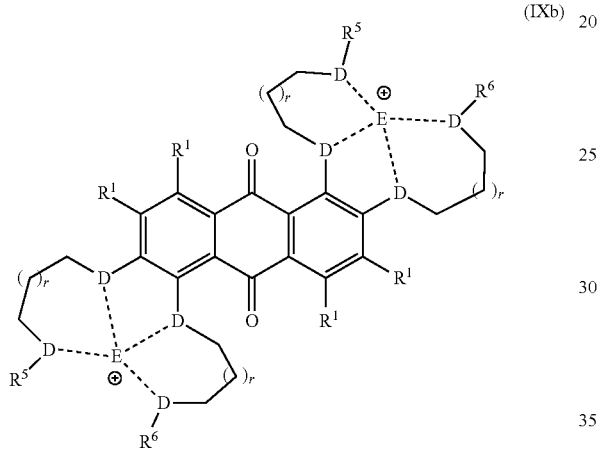
(IXb)

wherein $R^1$ is independently at each occurrence hydrogen, halogen, a substituted or unsubstituted $C_{1-30}$ alkyl group (including, e.g., $C_{3-30}$ branched alkyl groups, $C_{1-30}$ fluoroalkyl group, and the like), a substituted or unsubstituted $C_{1-30}$ alkoxy group, a poly($C_{1-30}$ alkylene oxide) group; a substituted or unsubstituted $C_{3-30}$ cycloalkyl group, a substituted or unsubstituted $C_{6-30}$ aryl group, a substituted or unsubstituted $C_{2-30}$ heteroaryl group, a nitrile group, a nitro group, a thiol group, or a vinyl group, preferably hydrogen, optionally wherein any adjacent $R^1$ groups can form a cyclic group together; D is independently at each occurrence oxygen (O) or nitrogen (N); r is independently at each occurrence 0 or 1; $R^5$ and $R^6$ are independently at each occurrence a $C_{1-6}$ alkyl group, a poly($C_{2-3}$ alkylene oxide) group, or a poly($C_{2-3}$ alkylene diamine) group, provided that when $R^5$ and $R^6$ are each poly($C_{2-3}$ alkylene oxide) group or a poly($C_{2-3}$ alkylene diamine) group, $R^5$ can optionally combine to form a ring with $R^6$; and metal cation E is a Group 1 element, a Group 2 element, a rare earth element, a Group 11 element, a Group 12 element, a Group 13 element, or a combination thereof; preferably wherein the metal cation C is Li, Ca, Sc, La, Al, Zn, Mg, Na, K, or a combination thereof. When $R^5$ and $R^6$ combine to form a cyclic group, the cyclic group can be a crown ether (e.g., when D is O) or an aza-crown ether (e.g., when D is N).

In an aspect, the electroactive species can be according to structure (IXb), wherein $R^1$ is hydrogen; $R^5$ and $R^6$ are methyl; D is oxygen; r is 0 and E is a metal cation. For example, the electroactive species can be of structure (IXc)

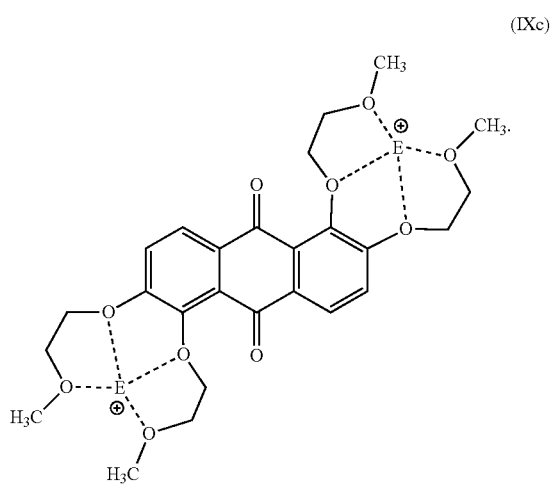
(IXc)

In an aspect, the electroactive species can be according to structure (IXb), wherein $R^1$ is hydrogen; $R^5$ and $R^6$ are methyl; D is nitrogen; r is 0 and E is a metal cation. For example, the electroactive species can be of structure (IXd)

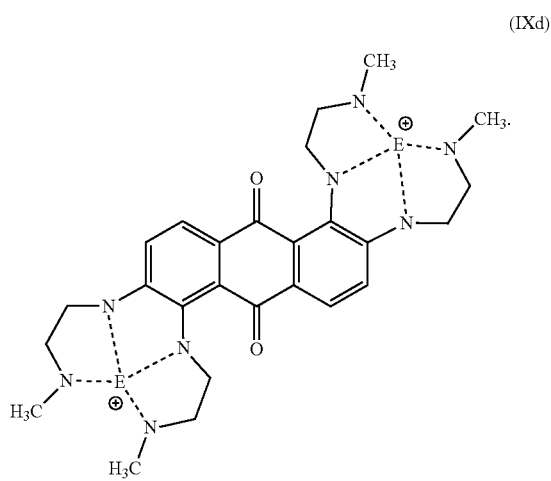
(IXd)

In an aspect, the electroactive species can be according to structure (X)

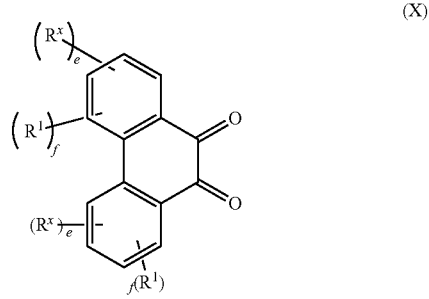
(X)

wherein each $R^1$ is independently at each occurrence hydrogen, halogen, a substituted or unsubstituted $C_{1-30}$ alkyl group (including, e.g., $C_{3-30}$ branched alkyl groups, $C_{1-30}$ fluoroalkyl group, and the like), a substituted or unsubstituted $C_{1-30}$ alkoxy group, a poly($C_{1-30}$ alkylene oxide)

group; a substituted or unsubstituted $C_{3-30}$ cycloalkyl group, a substituted or unsubstituted $C_{6-30}$ aryl group, a substituted or unsubstituted $C_{2-30}$ heteroaryl group, a nitrile group, a nitro group, a thiol group, or a vinyl group, optionally wherein any adjacent $R^1$ groups can form a cyclic group together; $R^x$ is independently at each occurrence the group -(L)$_z$-A; e is independently at each occurrence 0 to 4, provided that at least one occurrence of e is 1, and f is independently at each occurrence 0 to 4, provided that the valence of each phenyl group of the anthraquinone is not exceeded (e.g., each e/f pair sums to 4). In an aspect, each occurrence of e is 1.

In an aspect, the electroactive species can be according to structure (X), wherein A is a —NR$^2$R$^3$R$^4$ ammonium group, preferably, wherein each of R$^2$, R$^3$ and R$^4$ are methyl or benzyl; z is 0; R$^1$ is hydrogen; each occurrence of e is 1; and each occurrence of f is 3.

In an aspect, the electroactive species can be according to structure (X), wherein A is a hydroxyl group, an amine group, an amide group, or a thiol group, preferably a hydroxyl group; z is 1; R$^1$ is hydrogen; each occurrence of e is 1; each occurrence of f is 3; and L is a linking group comprising a $C_6$ arylene group.

The stabilizing group can be advantageously positioned on the quinone core such that it can provide stability to the anion adduct (e.g., through coulombic interactions with the anion adduct, through electron withdrawing inductive effects, as a hydrogen bond donor to the anion adduct, or a combination thereof). In some aspects, the stabilizing group may be 10 Angstroms or less away from at least one ketone group of the quinone core (e.g., through-space distance). In some aspects, the stabilizing group may be 10 or less, or 8 or less, or 1 to 10, or 2 to 10, or 1 to 8, or, 2 to 8, or 1 to 5, or 2 to 5 atoms away from at least one ketone group of the electroactive species. In describing the distance of the stabilizing group in terms of the number of "atoms away" from at least one ketone group of the quinone core, it will be understood that distance is counted from the carbonyl carbon of the ketone group to the functional group, with the carbonyl carbon being "0". For example, in the first example shown below, the stabilizing group A (e.g., a pyridinium group) is one atom away from a ketone group, and in the second example, the stabilizing group A (e.g., a hydroxyl group) is 4 atoms away from a ketone group

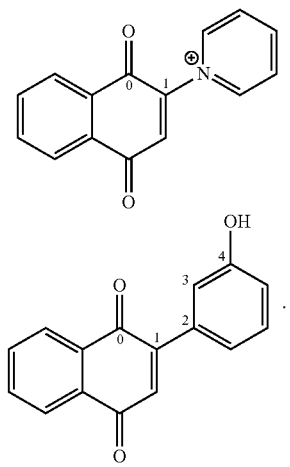

In some aspects, an association constant between the reduced electroactive species comprising the stabilizing group and the Lewis acid gas is greater than an association constant between the reduced electroactive species and the Lewis acid gas in the absence of the stabilizing group.

In some aspects, a reaction equilibrium constant between the reduced electroactive species comprising the stabilizing group and the Lewis acid gas is greater than a reaction equilibrium constant between the reduced electroactive species and the Lewis acid gas when the electroactive species does not include the stabilizing group. For example, a reaction equilibrium constant between the semiquinone anion or the quinone dianion and the Lewis acid gas, wherein the semiquinone anion or the quinone dianion comprises a stabilizing group such as a cationic group or a hydrogen bond donor, may be greater than a reaction equilibrium constant between the semiquinone anion or the quinone dianion and the Lewis acid gas when the semiquinone anion or the quinone dianion does not include the stabilizing group. In some aspects, particularly when the stabilizing group is a cationic group, a reaction equilibrium constant between the reduced electroactive species comprising the cationic stabilizing group and the Lewis acid gas may be greater than a reaction equilibrium constant between a reduced state of a corresponding nonionic electroactive species (i.e., not including the cationic stabilizing group) and the Lewis acid gas, wherein the nonionic electroactive species has a reduction potential that is the same as the reduced electroactive species comprising the stabilizing group.

In some aspects, the forming of the anion adduct from the reduced electroactive species comprising the stabilizing group and the Lewis acid gas is kinetically more favorable than forming of the anion adduct from an equivalent reduced electroactive species not including the stabilizing group and the Lewis acid gas.

In some aspects, the forming of the anion adduct from the reduced electroactive species comprising the stabilizing group and the Lewis acid gas is thermodynamically more favorable than forming of the anion adduct from an equivalent reduced electroactive species not including the stabilizing group and the Lewis acid gas.

In some aspects, the forming of the anion adduct from the reduced electroactive species comprising the stabilizing group and the Lewis acid gas is thermodynamically and kinetically more favorable than forming of the anion adduct from an equivalent reduced electroactive species not including the stabilizing group and the Lewis acid gas.

In some aspects, when the stabilizing group is a cationic group, the forming of the anion adduct from the reduced electroactive species comprising the stabilizing group and the Lewis acid gas is kinetically more favorable than forming an anion adduct from the reduced state of a nonionic electroactive species having a reduction potential that is the same as the reduced electroactive species comprising the stabilizing group and the Lewis acid gas.

In some aspects, when the stabilizing group is a cationic group, the forming of the anion adduct from the reduced electroactive species comprising the stabilizing group and the Lewis acid gas is thermodynamically more favorable than forming an anion adduct from the reduced state of a nonionic electroactive species having a reduction potential that is the same as the reduced electroactive species comprising the stabilizing group and the Lewis acid gas.

In some aspects, when the stabilizing group is a cationic group, the forming of the anion adduct from the reduced electroactive species comprising the stabilizing group and the Lewis acid gas is kinetically and thermodynamically more favorable than forming an anion adduct from a reduced state of a nonionic electroactive species having a reduction potential that is the same as the reduced electroactive species comprising the stabilizing group and the Lewis acid gas.

In some aspects, when the stabilizing group is a cationic group, an association constant between the reduced electroactive species comprising the stabilizing group and the Lewis acid gas is greater than an association constant between a reduced state of a nonionic electroactive species having a reduction potential that is the same as the reduced electroactive species comprising the stabilizing group and the Lewis acid gas.

In some aspects, the forming of the anion adduct from the reduced electroactive species comprising a hydrogen bond donor stabilizing group and the Lewis acid gas kinetically favors the forming of the anion adduct compared to a reduced electroactive species and the Lewis acid gas in the absence of the hydrogen bond donor stabilizing group.

In some aspects, the stabilizing group is the hydrogen-bond donor, and a reaction equilibrium constant between the semiquinone anion or the quinone dianion and the Lewis acid gas in the presence of the hydrogen-bond donor is greater than a reaction equilibrium constant between a semiquinone anion or the quinone dianion and the Lewis acid gas where the hydrogen-bond donor is not present.

In some aspects, the stabilizing group is the hydrogen-bond donor, and an association constant between the semiquinone anion or the quinone dianion and the Lewis acid gas in the presence of the hydrogen bond donor is greater than an association constant between a semiquinone anion or the quinone dianion and the Lewis acid gas where the hydrogen bond donor is not present.

In some aspects, the presence of the stabilizing group on the electroactive species can shift the reduction potential relative to the same electroactive species not including the stabilizing group.

In particular, when the stabilizing group is a cationic group, the reduction potential may be shifted relative to the corresponding unfunctionalized electroactive species. In an aspect, the reduction potential of the electroactive species including a cationic stabilizing group can be shifted 0.1 to 1.2 V relative to the reduction potential of the corresponding unfunctionalized (nonionic) electroactive species. For example, in an aspect wherein one stabilizing group is present on the electroactive species, particularly when the stabilizing group is a cationic group, the reduction potential of the electroactive species including a cationic stabilizing group can be shifted 0.1 to 1.2 V. or 0.1 to 1.1 V, or 0.1 to 1.0 V, or 0.1 to 0.9 V, or 0.2 to 1.9 V, or 0.5 to 0.9 V, or 0.6 to 0.9 V, each relative to the reduction potential of the corresponding unfunctionalized (nonionic) electroactive species. The reduction potential can shift by 0.1 to 1.2 V in the positive or negative direction relative to the reduction potential of the corresponding unfunctionalized (nonionic) electroactive species. As used herein, "a nonionic electroactive species having a reduction potential that is the same as the reduced electroactive species" means that the nonionic electroactive species has a reduction potential that is within 50 to 60 mV of the reduction potential of the electroactive species comprising the stabilizing group. It will be understood that the nonionic electroactive species being used for comparison in these aspects may or may not have the same core quinone structure, as long as the reduction potential is substantially the same as the electroactive species comprising the stabilizing group (e.g., within 50 to 60 mV).

The electroactive species may be chosen so that at least one reduced state of the electroactive species has a strong affinity for the Lewis acid gas. In an aspect, in a reduced state, the electroactive species can have a binding constant with the Lewis acid gas of at least 10 liters/mole ($M^{-1}$), or at least $10^2$ $M^{-1}$, or at least $10^3$ $M^{-1}$ at room temperature (e.g., 23° C.). For example, the reduced electroactive species may have a binding constant with the Lewis acid gas that is 10 to $10^{20}$ $M^{-1}$, $10^3$ to $10^{19}$ $M^{-1}$, $10^4$ to $10^{18}$ $M^{-1}$, $10^5$ to $10^{17}$ $M^{-1}$, $10^6$ to $10^{16}$ $M^{-1}$, or $10^7$ to $10^{15}$ $M^{-1}$. In an aspect, the binding constant with the Lewis acid gas is $10^5$ to $10^{20}$ $M^{-1}$, or $10^{10}$ to $10^{15}$ $M^{-1}$.

In an aspect, the electroactive species can have at least two oxidation states. When the electroactive species is in the first oxidation state, it can be considered to be in an "active state", wherein the affinity for the Lewis acid gas can be high (i.e., the electroactive species in the "active state" can have a binding constant with the Lewis acid gas). In the second oxidation state, the electroactive species can be considered to be in a "deactivated" state, wherein the affinity for the Lewis acid gas is reduced relative to the affinity for the Lewis acid gas of the "active" state. For example, the electroactive species can have a ratio of the binding constant in the deactivated state to the binding constant in the active state of 0.9:1 to $10^{-20}$:1, for example, 0.9:1, 0.8:1, 0.5:1, 0.1:1, $10^{-2}$:1, $10^{-3}$:1, $10^{-4}$:1, or $10^{-20}$:1. In an aspect, the binding constant with the Lewis acid gas in the deactivated state can be 0 (i.e., the deactivated state is essentially inactive towards the Lewis acid gas species).

The electroactive species can have at least one oxidation state wherein the Lewis acid gas can be released from the electroactive species. For example, in an aspect, the electroactive species can have at least one oxidized state, wherein upon oxidation to the oxidized state, the Lewis acid gas can be released from the electroactive species. In an aspect, the binding constant of the reduced electroactive species to the Lewis acid gas can be greater than the binding constant of the corresponding oxidized electroactive species to the Lewis acid gas. Accordingly, in an advantageous feature, capture and release of the Lewis acid gas can be achieved through redox cycling.

The electroactive species can be capable of binding the Lewis acid gas on a timescale on the order of minutes, on the order of seconds, on the order of milliseconds, or on the order of microseconds or less.

In an aspect, the electroactive species can have a reduced state in which the electroactive species is capable of bonding with the Lewis acid gas, and there is at least one temperature (e.g., in a range of greater than or equal to 223 K, greater than or equal to 248 K, greater than or equal to 273 K, or greater than or equal to 298 K, and up to 323 K, up to 348 K, or up to 413 K, for example 298 K) at which it is thermodynamically unfavorable for the reduced electroactive species to react with dioxygen ($O_2$). In an aspect, the electroactive species can have a reduced state in which the electroactive species is capable of bonding with the Lewis acid gas, and there is at least one temperature (e.g., 298 K) at which it is kinetically unfavorable for the reduced electroactive species to react with dioxygen ($O_2$) because, e.g., a rate constant for the reaction with oxygen is too slow for a reaction to occur on a timescale commensurate with capture of the Lewis acid gas. Accordingly, the electroactive species provides specificity towards capture of the Lewis acid gas over dioxygen.

In some aspects, the electroactive species can be in the form of an electroactive material (e.g. a functionalized carbon nanotube or the like, wherein the carbon nanotube is functionalized with one or more electroactive species comprising the stabilizing group).

Also provided is an electroactive polymer or oligomer comprising electroactive species and stabilizing groups. At least a portion of the repeating units of the electroactive polymer or oligomer comprise the stabilizing group of the present disclosure, either covalently bound to a quinone core of an electroactive species-based repeating unit, or covalently bound to a repeating unit on the same polymer chain as an electroactive species-based repeating unit, but not directly covalently bound to the quinone core.

As used herein, the term "polymer" refers to structures having greater than 10 repeating units. As used herein, the term "oligomer" refers to structures having 2 to 10 repeating units. In an aspect, at least a portion of the electroactive polymer or oligomer includes a backbone wherein at least one electroactive species is covalently bound to the backbone. In an aspect, the electroactive species may form at least a portion of the polymer backbone.

In an aspect, at least a portion of the repeating units can be derived from the electroactive species comprising the stabilizing group covalently bound to the quinone core structure. In some aspects, the electroactive polymer or oligomer can include only repeating units derived from the electroactive species comprising the stabilizing group of the present disclosure (e.g., a homopolymer). In another aspect, the electroactive polymer or oligomer can optionally further include repeating units derived from an electroactive species different from the electroactive species of the present disclosure (e.g., a copolymer). In another aspect, the electroactive polymer or oligomer can include repeating units derived from two or more electroactive species comprising the stabilizing group of the present disclosure. Stated another way, the electroactive polymer or oligomer can comprise repeating units derived from electroactive species comprising two or more types of stabilizing groups (e.g., two or more types of cationic groups; two or more types of hydrogen bond donor groups; or at least one type of cationic group and at least one type of hydrogen bond donor group).

In an aspect, the electroactive polymer or oligomer can comprise repeating units derived from 1 to 100 mole percent of the electroactive species of the present disclosure and 0 to 99 mole percent of an electroactive species different from the electroactive species of the present disclosure, for example a substituted or unsubstituted quinone, a substituted or unsubstituted tetrone, a substituted or unsubstituted bipyridinium, a substituted or unsubstituted bipyridine, a substituted or unsubstituted phenazine, a substituted or unsubstituted benzimidazole, a substituted or unsubstituted benzotriazole, a substituted or unsubstituted indole, a substituted or unsubstituted viologen, a substituted or unsubstituted pyrazinium, a substituted or unsubstituted pyrimidinium, a substituted or unsubstituted quinoline, a substituted or unsubstituted isoquinoline, a substituted or unsubstituted quinoxalinium, a substituted or unsubstituted pyrylium, a substituted or unsubstituted pyrazine, a substituted or unsubstituted pyridinium, a substituted or unsubstituted tetrazolium, a substituted or unsubstituted verdazyl, a substituted or unsubstituted quinodimethane, a substituted or unsubstituted tricyanovinylbenzene, a substituted or unsubstituted tetracyanoethylene, a substituted or unsubstituted thioketone, a substituted or unsubstituted thioquionone, a substituted or unsubstituted disulfide, or a combination thereof.

In an aspect, the electroactive polymer includes repeating units derived from a quinone comprising at least one substituent of the formula -(L)$_z$-A. For example, the polymer can include repeating units derived from 1,4-benzoquinone comprising at least one substituent of the formula -(L)$_z$-A, 1,2-benzoquinone comprising at least one substituent of the formula -(L)$_z$-A, 1,4-naphthoquinone comprising at least one substituent of the formula -(L)$_z$-A, 1,2-naphthoquinone comprising at least one substituent of the formula -(L)$_z$-A, anthraquinone comprising at least one substituent of the formula -(L)$_z$-A, phenanthrenequinone comprising at least one substituent of the formula -(L)$_z$-A, and the like, or a combination thereof. In an aspect, the electroactive polymer can include a poly(anthraquinone) comprising at least one substituent of the formula -(L)$_z$-A. In an aspect, the electroactive polymer can comprise a substituted or unsubstituted poly(vinyl anthraquinone), comprising at least one substituent of the formula -(L)$_z$-A. In an aspect, the electroactive polymer can comprise a poly(phenylnaphthoquinone) comprising at least one substituent of the formula -(L)$_z$-A.

In a specific aspect, an electroactive polymer or oligomer comprises repeating units derived from an electroactive species derived from 1,4-benzoquinone and comprising a stabilizing group. For example, the electroactive polymer or oligomer can comprise repeating units according to structure (XI)

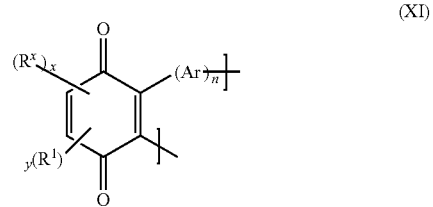

wherein $R^1$ and $R^x$ are as described above; x is 1 or 2 and y is 0 or 1, provided that the sum of x and y is 2; and Ar is a substituted or unsubstituted $C_{6-20}$ arylene group; and n is 0 or 1. In some aspects, when present, the Ar group can optionally be substituted with a stabilizing group (e.g., a cationic group or a hydrogen bond donor) as described above. In such aspects, it may be possible for x to be 0 if the presence of the stabilizing group on the Ar group is sufficient to provide the desired stabilization effects on the anion adduct of the electroactive species and the Lewis acid gas.

When present, the Ar group can be, for example, a substituted or unsubstituted phenylene, biphenylene, fluorene, thiophene, or a combination thereof. In an aspect, Ar can preferably be a substituted or unsubstituted phenylene group.

In a specific aspect, an electroactive polymer or oligomer comprises repeating units derived from an electroactive species derived from a naphthoquinone core and comprising a stabilizing group. For example, the electroactive polymer or oligomer can comprise repeating units according to structure (XII)

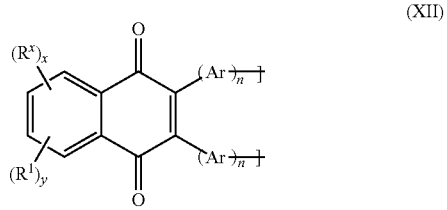

wherein $R^1$ and $R^x$ are as described above; x is 1 to 4; y is 0 to 3, provided that the sum of x and y is 4; n is independently at each occurrence 0 or 1, and Ar is independently at each occurrence a substituted or unsubstituted $C_{6-20}$ arylene group. In some aspects, when present, the Ar group can optionally be substituted with a stabilizing group (e.g., a cationic group or a hydrogen bond donor) as described above. In such aspects, it may be possible for x to be 0 if the presence of the stabilizing group on the Ar group is sufficient to provide the desired stabilization effects on the anion adduct of the electroactive species and the Lewis acid gas. For example, an electroactive polymer or oligomer can comprise repeating units according to structure (XIIa) or (XIIb)

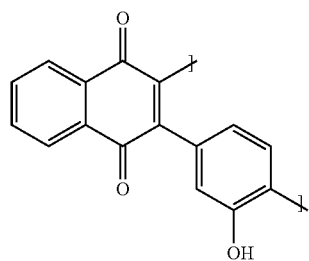

(XIIa)

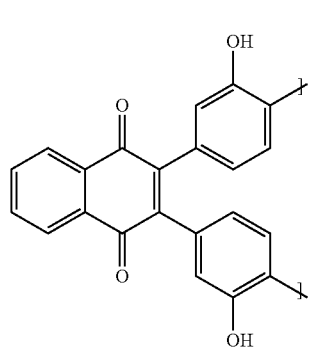

(XIIb)

In another specific aspect, an electroactive polymer or oligomer comprises repeating units derived from an electroactive species derived from a phenanthrenequinone core and comprising a stabilizing group. For example, the electroactive polymer or oligomer can comprise repeating units according to structure (XIII)

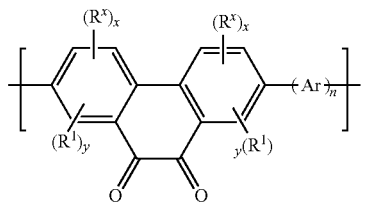

(XIII)

wherein $R^1$ and $R^x$ are as described above; x is independently at each occurrence 0 to 3, provided that at least one occurrence of x is 1; y is independently at each occurrence 0 to 3, provided that the valence of the phenyl group is not exceeded (e.g., each x/y pair sums to 3); n is 0 to 2, or 0 to 1, and Ar is a substituted or unsubstituted $C_{6-20}$ arylene group. In some aspects, when present, the Ar group can optionally be substituted with a stabilizing group (e.g., a cationic group or a hydrogen bond donor) as described above. In such aspects, it may be possible for both occurrences of x to be 0 if the presence of the stabilizing group on the Ar group is sufficient to provide the desired stabilization effects on the anion adduct of the electroactive species and the Lewis acid gas. For example, an electroactive polymer or oligomer can comprise repeating units according to structure (XIIIa) or (XIIIb)

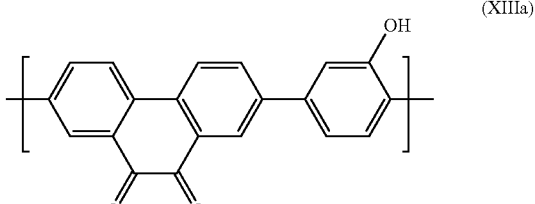

(XIIIa)

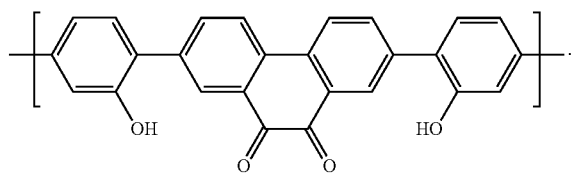

(XIIIb)

In some aspects, both the quinone core and the stabilizing group may form a part of the polymer or oligomer backbone, for example when the stabilizing group is a cationic group such as an ammonium group. In a specific aspect, the electroactive polymer or oligomer comprises repeating units derived from an electroactive species derived from a phenanthrenequinone core and a cationic ammonium group. For example, the electroactive polymer or oligomer can comprise repeating units according to structure (XIV)

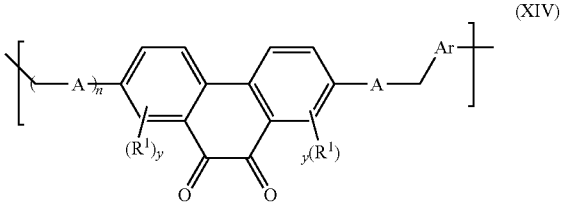

(XIV)

wherein $R^1$ is as defined above; y is independently at each occurrence 3, A is a —$NR^2R^3$— ammonium group, wherein $R^2$ and $R^3$ are independently at each occurrence a substituted or unsubstituted $C_{1-6}$ alkyl group or a substituted or unsubstituted benzyl group; n is 0 or 1; and Ar is a substituted or unsubstituted $C_{6-20}$ arylene group. In a specific aspect, the polymer or oligomer can comprise repeating units according to structure (XIVa) or (XIVb)

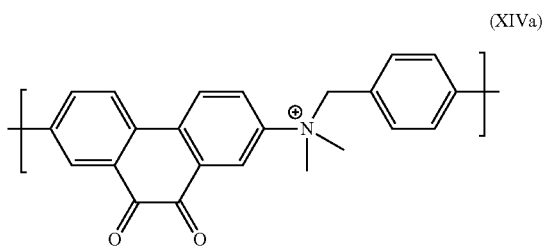

(XIVa)

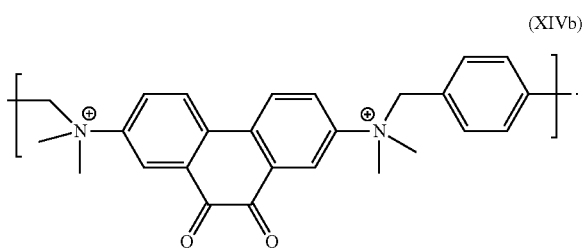

(XIVb)

In some aspects, the polymer or the oligomer can comprise the electroactive species of the present disclosure as a pendent group off of the polymer backbone, rather than incorporated into the polymer backbone. For example, the polymer or oligomer can comprise repeating units derived from substituted or unsubstituted $C_{1-12}$ alkyl(meth)acrylate monomers, substituted or unsubstituted alkenyl aromatic monomers (e.g., styrene), substituted or unsubstituted vinyl monomers, and the like, wherein at least a portion of the repeating units are derived from monomers which have been suitably functionalized to covalently attach the electroactive species described herein.

In an aspect, the electroactive polymer or oligomer can comprise repeating units derived from a first monomer comprising a polymerizable group and an electroactive species comprising a quinone core structure, and a second monomer comprising a polymerizable group and a stabilizing group. The electroactive polymer or oligomer according to this aspect of the disclosure is therefore a copolymer comprising repeating units derived from at least the two foregoing monomers. The copolymer can be a random copolymer, an alternating copolymer, a block copolymer, or a combination thereof. In an aspect, the copolymer is a random copolymer. In an aspect, the copolymer is an alternating copolymer. In an aspect, the electroactive polymer or oligomer can consist of the repeating units derived from the first monomer and second monomer. In an aspect, additional monomer units may be present. In an aspect, when present, the additional monomer units may have a quinone core structure different from that of the first monomer. In an aspect, when present, the additional monomer units may have a stabilizing group different from that of the second monomer. In an aspect, when present, additional monomer units may not include a quinone core or a stabilizing group as defined here. For example, the polymer or oligomer may comprise additional repeating units derived from a monomer selected to impart a particular solubility or other property to the resulting electroactive polymer or oligomer. An additional monomer unit can generally be of any type or present in any amount provided that one or more desired properties of the electroactive polymer or oligomer is not adversely affected. For example, an additional monomer unit may be present in an amount of 50 mole percent or less, or 40 mole percent or less, or 30 mole percent or less, or 20 mole percent or less, or 10 mole percent or less, or 5 mole percent or less, or 1 mole percent or less.

The polymerizable group of the first and second monomers can be the same or different and can be any polymerizable group that is generally known including, for example, ethylenically unsaturated groups. In an aspect, the polymerizable group may be a (meth)acrylate group, a styrenic group, a cyclic olefin (e.g., norbornene), and the like, or a combination thereof. In an aspect, the polymerizable group can be a norbornene moiety.

The quinone core structure of the first monomer can be as described above, for example according to formula (I) or formula (II). In an aspect, the quinone core structure can comprise, for example, 1,4-benzoquinone. In an aspect, the quinone can be fused to a cyclic olefin (e.g., norbornene) polymerizable moiety to form a fused ring structure.

In an aspect, the first monomer can be of the formula

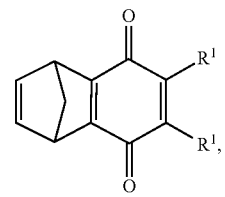

wherein each $R^1$ is independently at each occurrence hydrogen, halogen (e.g., chloro, bromo, iodo), a substituted or unsubstituted $C_{1-30}$ alkyl group, a substituted or unsubstituted $C_{1-30}$ alkoxy group, a poly($C_{1-30}$ alkylene oxide) group; a substituted or unsubstituted $C_{3-30}$ cycloalkyl group, a substituted or unsubstituted $C_{3-30}$ branched alkyl group, a substituted or unsubstituted $C_{6-30}$ aryl group, a substituted or unsubstituted $C_{2-30}$ heteroaryl group, a substituted or unsubstituted $C_{1-30}$ fluoroalkyl group, a nitrile group, a nitro group, a thiol group, or a vinyl group, optionally wherein any adjacent $R^1$ groups can form a cyclic group together.

The stabilizing group of the second monomer can be a cationic group, a hydrogen bond donor, or a combination thereof, as described above. In an aspect, the stabilizing group can be a hydrogen bond donor. In a specific aspect, the stabilizing group can be a hydroxyl group. In an aspect, the second monomer can be a hydroxyl-functionalized norbornene.

In an aspect, the second monomer can be of the formula

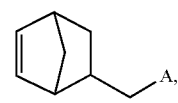

wherein A is a stabilizing group comprising a hydrogen bond donor or a cationic group. In an aspect, A can be a hydroxyl group.

In an aspect, the electroactive polymer or oligomer can be of the formula

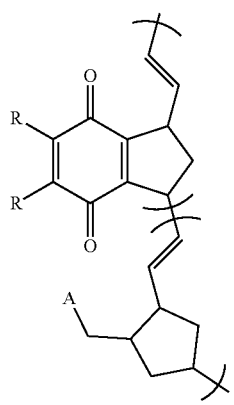

wherein $R^1$ and A can be as defined above. In an aspect, the polymer can be a stochastic polymer.

A through-space distance between a stabilizing group of the second monomer and a ketone of the quinone core structure of the first monomer in the electroactive polymer or oligomer is preferably 10 Angstroms or less, in order to provide stability to an anion adduct, as discussed above.

The electroactive polymer or the electroactive oligomer can optionally be crosslinked.

Crosslinking can be accomplished by various methods generally known in the art. The skilled person, with the benefit of this disclosure, would be able to determine a suitable crosslinking chemistry based on the selection of the electroactive species.

In some aspects, the electroactive species can be incorporated into hydrogels, ionogels, organogels, or combinations thereof. Such cross-linked polymeric materials are generally known in the art and may in some instances comprise electroactive species described herein as part of the three-dimensional structure (e.g., via covalent bonds). However, in some aspects, electroactive species of the present disclosure can be incorporated into the cross-linked polymeric materials via adsorption (e.g., physisorption and/or chemisorption). In some aspects, the electroactive species can be included in an extended network. For example, a metal organic framework (MOF) or a covalent organic framework (COF) may comprise the electroactive species. In some aspects, functionalized carbonaceous materials can include the electroactive species, for example, functionalized graphene, functionalized carbon nanotubes, functionalized carbon nanoribbons, edge-functionalized graphite, or combinations thereof.

Also provided is a method for separating a Lewis acid gas from a fluid mixture including the Lewis acid gas. The method includes contacting the fluid mixture with the electroactive species described herein or the polymer, oligomer, or other material comprising the electroactive species, wherein the electroactive species is in a reduced state to form an anion adduct between the Lewis acid gas and the reduced electroactive species.

The fluid mixture includes a Lewis acid gas. The term "Lewis acid gas" refers to a gaseous species able to accept an electron pair from an electron pair donor (e.g., by having an empty orbital energetically accessible to the electron pair of the donor).

The Lewis acid gas can include carbon dioxide ($CO_2$), carbonyl sulfide (COS), a sulfur oxide such as sulfur dioxide ($SO_2$) or sulfur trioxide ($SO_3$); an organosulfate ($R_2SO_4$) such as dimethyl sulfate; a nitrogen oxide such as nitrogen dioxide ($NO_2$) or nitrogen trioxide ($NO_3$); a phosphate ester ($R_3PO_4$) such as trimethyl phosphate; a sulfide ($R_2S$), an ester (RCOOR') such as methyl formate or methyl acrylate; an aldehyde (RCHO) such as formaldehyde or acrolein; a ketone ($R'_2CO$) such as acetone, an isocyanate (R'NCO) such as methyl isocyanate; an isothiocyanate (R'NCS); a borane ($BR''_3$) such as trimethyl borane, a borate ($R''_3BO_3$) such as trimethyl borate; or a combination thereof, each R is independently hydrogen, $C_{1-12}$ alkyl, $C_{3-12}$ cycloalkyl, $C_{1-12}$ heterocycloalkyl, $C_{6-20}$ aryl, or $C_{1-12}$ heteroaryl; each R' is independently $C_{1-12}$ alkyl, $C_{3-12}$ cycloalkyl, $C_{1-12}$ heterocycloalkyl, $C_{6-20}$ aryl, or $C_{1-12}$ heteroaryl; each R" is independently hydrogen, halogen, $C_{1-12}$ alkyl, $C_{3-12}$ cycloalkyl, $C_{1-12}$ heterocycloalkyl, $C_{6-20}$ aryl, or $C_{1-12}$ heteroaryl. In one or more aspects, the Lewis acid gas can include $CO_2$, COS, $SO_2$, $SO_3$, $NO_2$, or $NO_3$. In still other aspects, the Lewis acid gas is $CO_2$.

The method can be conducted in an electrolyte, for example a non-aqueous. The non-aqueous electrolyte may be a solid or a liquid having a suitable conductivity at room temperature (e.g., 23° C.). The non-aqueous electrolyte may be an organic electrolyte (e.g., N, N-dimethylformamide, liquid quinones), an ionic liquid, a liquid eutectic mixture of organic materials, or a combination thereof. One example of liquid quinones that may be suitable for the methods and systems herein is a liquid mixture of benzoquinone and a second quinone such as a naphthoquinone as is described in Shimizu A, Takenaka K, Handa N, Nokami T, Itoh T, Yoshida JI. Liquid Quinones for Solvent-Free Redox Flow Batteries, *Advanced Materials*. 2017 November; 29(41): 1606592, the content of which is incorporated herein by reference in its entirety. In one or more aspects, a liquid mixture of benzoquinone and a second quinone such as a naphthoquinone can be used for both the electroactive species and the non-aqueous electrolyte. In some aspects, the non-aqueous electrolyte includes a carbonate ester. For example, in some aspects, the non-aqueous electrolyte may include dimethyl carbonate, diethyl carbonate, ethyl-methyl carbonate, ethylene carbonate, propylene carbonate, or a combination thereof.

In an aspect, the organic electrolyte can include an organic solvent and a supporting electrolyte. Exemplary organic solvents include, but are not limited to, acetonitrile, dimethylformamide, propylene carbonate, dimethylsulfoxide, polyethylene glycol, diglyme, or a combination thereof.

The electrolyte can further include a supporting electrolyte. The supporting electrolyte is commonly a quaternary ammonium salt because of its electrical characteristics such as superior electric conductivity in a non-aqueous electrolyte and the like. Examples of the quaternary ammonium salt include, for example, $(CH_3)_4N \cdot BF_4$, $(CH_3)_3C_2H_5N \cdot BF_4$, $(CH_3)_2(C_2H_5)_2N \cdot BF_4$, $CH_3(C_2H_5)_3N \cdot BF_4$, $(C_2H_5)_4N \cdot BF_4$, $(C_3H_7)_4N \cdot BF_4$, $CH_3(C_4H_9)_3N \cdot BF_4$, $(C_4H_9)_4N \cdot BF_4$, $(C_6H_{13})_4N \cdot BF_4$, $(C_2H_5)_4N \cdot ClO_4$, $(C_2H_5)_4N \cdot BF_4$, $(C_2H_5)_4N \cdot PF_6$, $(C_2H_5)_4N \cdot AsF6$, $(C_2H_5)_4N \cdot SbF_6$, $(C_2H_5)_4N \cdot CF_3SO_3$, $(C_2H_5)_4N \cdot C_4F_9SO_3$, $(C_2H_5)_4N-(CF_3SO_2)_2N$, $(C_2H_5)_4N \cdot BCH_3(C_2H_5)_3$, $(C_2H_5)_4N \cdot B(C_2H_5)_4$, $(C_2H_5)_4N \cdot B(C_4H_9)_4$, $(C_2H_5)_4N \cdot B(C_6H_5)_4$, and the like, hexafluorophosphates thereof, and the like.

The supporting electrolyte can be present in an amount of 0 to 70 wt %, based on the total weight of the non-aqueous electrolyte.

In an aspect, the electrolyte includes an ionic liquid, for example a room temperature ionic liquid (RTIL). Ionic liquids, also referred to as molten salts because they are liquid at room temperature, e.g., 23° C., can have low volatility, for example a vapor pressure of less than $10^{-5}$ Pascal (Pa), or $10^{10}$ to $10^{-5}$ Pa at a temperature of 23° C., which can reduce the risk of the separator drying out, and allow for reduction in loss of the electrolyte due to evaporation or entrainment. In an aspect the ionic liquid accounts for substantially all (e.g., at least 80 volume percent (vol %), or at least 90 vol %, or at least 95 vol %, or at least 98 vol %, at least 99 vol %, or at least 99.9 vol %) of the non-aqueous electrolyte.

The ionic liquid includes an anion component and a cation component. The anion of the ionic liquid can include, but is not limited to, one or more of halide, sulfate, sulfonate, carbonate, bicarbonate, phosphate, nitrate, nitrate, acetate, $PF_6$, $BF_4$, trifluoromethanesulfonate (triflate), nonaflate, bis(trifluoromethylsulfonyl)amide, bis(trifluoromethanesulfonyl)imide, trifluoroacetate, heptafluororobutanoate, haloaluminate, triazolide, or an amino acid derivative (e.g., proline with the proton on the nitrogen removed). The cation of the ionic liquid can include, but is not limited to, one or more of imidazolium, pyridinium, pyrrolidinium, phosphonium, ammonium, sulfonium, thiazolium, pyrazolium, piperidinium, triazolium, pyrazolium, oxazolium, guanidinium, an alkali cation, or dialkylmorpholinium. In an aspect, the room temperature ionic liquid includes an imidazolium as a cation component. In an aspect, the room temperature ionic liquid includes 1-butyl-3-methylimidazolium ("Bmim") as a cation component. In an aspect, the room temperature ionic liquid includes bis(trifluoromethyl-sulfonyl)imide ("TFSI") as an anion component. In an aspect, the room temperature ionic liquid includes 1-butyl-3-methylimidazolium bis(trifluoromethylsulfonyl)-imide ("[Bmim][TFSI]"). In an aspect, the room temperature ionic liquid includes 1-butyl-3-methylimidazolium tetrafluoroborate ("$BF_4$") ("[Bmim][$BF_4$]").

In an aspect, the electrolyte includes an ionic liquid that may include an unsubstituted or substituted imidazolium, an unsubstituted or substituted morpholinium, unsubstituted or substituted pyridinium, an unsubstituted or substituted pyrrolidinium, an unsubstituted or substituted piperidinium, an unsubstituted or substituted piperazinium, an unsubstituted or substituted pyrazinium, or a combination thereof. In a particular aspect, the ionic liquid may be 1-ethyl-3-methyl-imidazolium bis(trifluoromethanesulfonyl)imide, 1-ethyl-3-methylimidazolium bis(fluorosulfonyl)imide, 1-ethyl-3-methylimidazolium bis(pentafluorosulfonyl)imide, 1-ethyl-3-methylimidazolium dicyanamide, 1-ethyl-3-methylimidazolium tetrafluoroborate, 1-butyl-3-methylimidazolium bis(trifluoromethyl-sulfonyl)imide, 1-butyl-3-methylpyridinium bis(trifluoromethyl-sulfonyl)imide, N-methyl-N-propylpiperidinium bis(trifluoromethanesulfonyl)imide, or a combination thereof.

An electrochemical apparatus is also provided. The electrochemical apparatus includes a chamber including a negative electrode in electronic communication with an electroactive species in a reduced state, wherein the electroactive species includes the stabilizing group, wherein the chamber is configured to receive a fluid mixture including a Lewis acid gas. The electroactive species comprising the stabilizing group and the Lewis acid gas are as disclosed herein.

An electrochemical cell including the electroactive species in a reduced state represents another aspect of the present disclosure. In an aspect, the electrochemical cell includes the electroactive species and an electrolyte, for example a non-aqueous electrolyte. In some aspects, the electrochemical cell includes a first electrode including an electroactive species in a reduced state, wherein the electroactive species includes an oxidized state; and at least one reduced state wherein the electroactive species bonds with the Lewis acid gas to form the anion adduct. The electrochemical cell further includes a second electrode including a complementary electroactive layer, a first separator between the first electrode and the second electrode, and an electrolyte. In an aspect the first electrode and the second electrode can be identical in configuration or composition to provide a symmetric electrochemical cell.

The electroactive species comprising the stabilizing group can be present in an amount of 10 to 90 weight percent (wt %), based on the total weight of the first electrode. Within this range, the electroactive species can be present in an amount of at least 20 wt %, or at least 25 wt %, or at least 30 wt %, or least 40 wt %, or at least 50 wt %, based on the total weight of the first electrode. Also within this range, the electroactive species can be present in an amount of at most 80 wt %, or at most 70 wt %, or at most 60 wt %, or at most 50 wt %, or at most 45 wt %, or at most 40 wt %, based on the total weight of the first electrode. For example, the electroactive species can be present in an amount of 10 to 75 wt %, or 10 to 60 wt %, or 15 to 60 wt %, or 20 to 55 wt %, or 25 to 55 wt % or 30 to 50 wt %, based on the total weight of the first electrode.

The first separator may be a porous separator. The separator may include a polymer film, for example a film including a polyamide, a polyolefin, a polyaramid, a polyester, a polyurethane, an acrylic resin, and the like, or a combination thereof. The polymer may be coated on one or both sides with ceramic nanoparticles. In an aspect, the porous separator can comprise cellulose, a synthetic polymeric material, a polymer/ceramic composite material, or a ceramic material. Further examples of separators can include polyvinylidene difluoride (PVDF) separators, polytetrafluoroethylene (PTFE), PVDF-alumina composite separators, lithium superionic conductor (LiSICON) separators, and the like. Combinations of the foregoing can also be used. When combinations of various separators are used, they can generally be arranged in any order.

The separator can serve as a protective layer that can prevent the respective electrochemical reactions at each electrode from interfering with each other. The separator can also help electronically isolate the first and second electrodes from one another or from other components within the electrochemical cell to prevent a short-circuit. A person of ordinary skill, with the benefit of this disclosure, would be able to select a suitable separator.

In an aspect the separator can be partially or completely impregnated with the electrolyte. The electrolyte can comprise, for example, an ionic liquid, a salt dissolved in a nonvolatile solvent, or a combination thereof. Impregnating the separator with the electrolyte can be by submerging, coating, dipping, or otherwise contacting the separator with the electrolyte. Some or all of the pores of the porous separator can be partially or completely filled with the electrolyte. In an aspect, the separator can be saturated with the electrolyte.

The second electrode of the electrochemical cell includes a complementary electroactive layer. The complementary electroactive layer includes a second electroactive species which can be the same or different as the electroactive species of the first electrode (e.g., the same or different as the electroactive species comprising the stabilizing group as described herein).

In an aspect, the complementary electroactive layer includes the same electroactive species comprising the stabilizing group as the first electrode. In an aspect, the complementary electroactive layer includes a second electroactive species which is different from the first electroactive species of the first electrode. In an aspect, the second electroactive species of the complementary electroactive layer can be an electroactive organic molecule, an electroactive polymer, an electroactive oligomer, an electroactive inorganic complex, an electroactive metallocene, or a combination thereof. The second electroactive species may or may not also include a stabilizing group.

Exemplary electroactive organic compounds that may be used as the second electroactive species can include, but are not limited to, substituted or unsubstituted quinones or tetrones, bipyridines, phenazines, bipyridiniums or viologens, pyraziniums, pyrimidiniums, quinoxaliniums, pyryliums, pyridiniums, tetrazoliums, verdazyls, quinodimethanes, tricyanovinylbenzenes, tetracyanoethylene, thioketones, thioquionones, and disulfides. In an aspect, the second electroactive species includes a substituted or unsubstituted quinone (e.g., the quinone can include one or more functional groups or other moieties or linkages bound to the quinone). The choice of substituent (e.g., functional group) on the substituted quinone can depend on a variety of factors, including but not limited to its effect on the reduction potential of the substituted quinone. One of ordinary skill, with the benefit of this disclosure, would understand how to determine which substituents or combinations of substituents on the substituted quinone are suitable for the second electroactive species based on, for example, synthetic feasibility and resulting reduction potential. Exemplary functional groups can include, but are not limited to, halo (e.g., chloro, bromo, iodo), hydroxyl, carboxylate/carboxylic acid, sulfonate/sulfonic acid, alkylsulfonate/alkylsulfonic acid, phosphonate/phosphonic acid, alkylphosphonate/alkylphosphonic acid, acyl (e.g., acetyl or ethyl ester), amino, amido, quaternary ammonium (e.g., tetraalkylamino), branched or unbranched alkyl (e.g., $C_{1-18}$ alkyl), heteroalkyl, alkoxy, glycoxy, polyalkyleneglycoxy (e.g., polyethyleneglycoxy), imino, polyimino, branched or unbranched alkenyl, branched or unbranched alkynyl, aryl, heteroaryl, heterocyclyl, nitro, nitrile, thiyl, or carbonyl groups, any of which can be substituted or unsubstituted. Any suitable organic or inorganic counterion can be present in the foregoing charged species, for example an alkali metal, alkaline earth metal, ammonium, or a substituted ammonium of the formula $R_4N^+$ wherein each R is the same or different, and is independently a $C_{1-18}$ hydrocarbyl, provided that that least one R is hydrocarbyl.

In an aspect, the second electroactive species includes a substituted or unsubstituted quinone of structure (XV) or (XVI):

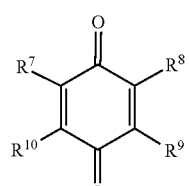

(XV)

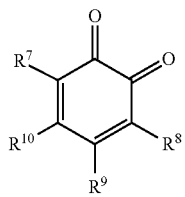

(XVI)

wherein $R^7$, $R^8$, $R^9$, and $R^{10}$ are independently at each occurrence hydrogen, halogen (e.g., chloro, bromo, iodo), hydroxyl, carboxylate/carboxylic acid, sulfonate/sulfonic acid, alkylsulfonate/alkylsulfonic acid, phosphonate and/or phosphonic acid, alkylphosphonate and/or alkylphosphonic acid, acyl (e.g., acetyl or ethyl ester), amino, amido, quaternary ammonium (e.g., tetraalkylamino), branched or unbranched $C_{1-18}$ alkyl, heteroalkyl, alkoxy, glycoxy, polyalkyleneglycoxy (e.g., polyethyleneglycoxy), imino, polyimino, branched or unbranched alkenyl, branched or unbranched alkynyl, aryl, heteroaryl, heterocyclyl, nitro, nitrile, thiyl, or carbonyl groups, any of which can be substituted or unsubstituted, and any two adjacent groups $R^7$ to $R^{10}$ can optionally form a cyclic group together.

In some aspects, the second electroactive species can include a substituted or unsubstituted quinone or tetrone, preferably 1,4-benzoquinone, 1,2-benzoquinone, 1,4-naphthoquinone, 1,2-naphthoquinone, anthraquinone, phenanthrenequinone, benzanthraquinone, dibenzoanthraquinone, 4,5,9,10-pyrenetetrone, or a combination thereof. Any of the foregoing can optionally be substituted as described above. In an aspect, the second electroactive species may include an optionally substituted naphthoquinone, an optionally substituted quinoline, an optionally substituted anthraquinone, an optionally substituted phenanthrenequinone (also referred to as an optionally substituted phenanthrenedione), or an optionally substituted thiochromene-dione. For example, the second electroactive species may include benzo[g]quinoline-5,10-dione, benzo[g]isoquinoline-5,10-dione, benzo[g]quinoxaline-5,10-dione, quinoline-5,8-dione, or 1-lamba$^4$-thiochromene-5,8-dione. Other regioisomers of the foregoing non-limiting exemplary second electroactive species may also be used (e.g., with substituents at different positions of the quinone).

In some aspects, the second electroactive species can include a substituted or unsubstituted bipyridine, a substituted or unsubstituted phenazine, a substituted or unsubstituted bipyridinium, a substituted or unsubstituted viologen, a substituted or unsubstituted pyrazinium, a substituted or unsubstituted pyrimidinium, a substituted or unsubstituted quinoxalinium, a substituted or unsubstituted pyrylium, a substituted or unsubstituted pyridinium, a substituted or unsubstituted tetrazolium, a substituted or unsubstituted verdazyl, a substituted or unsubstituted quinodimethanes, a substituted or unsubstituted tricyanovinylbenzene, a substituted or unsubstituted tetracyanoethylene, a substituted or unsubstituted thioketone, a substituted or unsubstituted thioquionone, a substituted or unsubstituted disulfide, or a combination thereof.

In an aspect, the second electroactive species is an electroactive polymer or oligomer. As defined previously, the term "polymer" refers to structures having greater than 10 repeating units. As used herein, the term "oligomer" refers to structures having 2 to 10 repeating units. In an aspect, at least a portion of the second electroactive polymer includes a polymer backbone wherein at least one of the second electroactive species is covalently bound to the polymer backbone. In an aspect, the second electroactive species may form at least a portion of the polymer backbone.

In an aspect, the second electroactive species includes a polymer or oligomer comprising a repeating unit derived from a substituted or unsubstituted quinone, a substituted or unsubstituted tetrone, a substituted or unsubstituted bipyridinium, a substituted or unsubstituted bipyridine, a substituted or unsubstituted phenazine, a substituted or unsubstituted benzimidazole, a substituted or unsubstituted benzotriazole, a substituted or unsubstituted indole, a substituted or unsubstituted viologen, a substituted or unsubstituted pyrazinium, a substituted or unsubstituted pyrimidinium, a substituted or unsubstituted quinoline, a substituted or unsubstituted isoquinoline, a substituted or unsubstituted quinoxalinium, a substituted or unsubstituted pyrylium, a substituted or unsubstituted pyrazine, a substituted or unsubstituted pyridinium, a substituted or unsubstituted tetrazolium, a substituted or unsubstituted verdazyl, a substituted or unsubstituted quinodimethane, a substituted or unsubstituted tricyanovinylbenzene, a substituted or unsubstituted tetracyanoethylene, a substituted or unsubstituted thioketone, a substituted or unsubstituted thioquionone, a substituted or unsubstituted disulfide, or a combination thereof.

Exemplary second electroactive species include a polymer or oligomer that includes one or more repeating units derived from a substituted or unsubstituted 1,4-benzoquinone, a substituted or unsubstituted 1,2-benzoquinone, a substituted or unsubstituted 1,4-naphthoquinone, a substituted or unsubstituted 1,2-naphthoquinone, a substituted or unsubstituted 2,3-diaminonaphthalene, a substituted or unsubstituted anthraquinone, a substituted or unsubstituted phenanthrenequinone, a substituted or unsubstituted benzanthraquinone, a substituted or unsubstituted dibenzoanthraquinone, a substituted or unsubstituted 4,5,9,10-pyrenetetrone, a substituted or unsubstituted indole, a substituted or unsubstituted quinoline, a substituted or unsubstituted isoquinoline, a substituted or unsubstituted benzimidazole, or a substituted or unsubstituted benzotriazole.

In an aspect, the second electroactive polymer includes repeating units derived from a quinone, which as described above can include 1,4-benzoquinone, 1,2-benzoquinone, 1,4-naphthoquinone, 1,2-naphthoquinone, anthraquinone, phenanthrenequinone, benzanthraquinone, dibenzoanthraquinone, 4,5,9,10-pyrenetetrone, or a combination thereof. In an aspect, the second electroactive polymer can include substituted or unsubstituted poly(anthraquinone). In an aspect, the second electroactive polymer can comprise a substituted or unsubstituted poly(vinyl anthraquinone). In an aspect, the second electroactive polymer can comprise a substituted or unsubstituted poly(phenylnaphthoquinone).

When the second electroactive species includes the electroactive polymer or the electroactive oligomer, the electroactive polymer or the electroactive oligomer can optionally be crosslinked. Crosslinking can be accomplished by various methods generally known in the art. The skilled person, with the benefit of this disclosure, would be able to determine a suitable crosslinking chemistry based on the selection of the electroactive species.

For example, in some aspects, the second electroactive species includes or is incorporated into hydrogels, ionogels, organogels, or combinations thereof. Such cross-linked polymeric materials are generally known in the art and may in some instances comprise the second electroactive species described herein as part of the three-dimensional structure (e.g., via covalent bonds). However, in some aspects, the second electroactive species can be incorporated into the cross-linked polymeric materials via adsorption (e.g., physisorption and/or chemisorption). In some aspects, the second electroactive species includes an extended network. For example, the second electroactive species may comprise a metal organic framework (MOF) or a covalent organic framework (COF). In some aspects, the second electroactive species includes functionalized carbonaceous materials. For example, the second electroactive species may include functionalized graphene, functionalized carbon nanotubes, functionalized carbon nanoribbons, edge-functionalized graphite, or combinations thereof.

In an aspect, the second electroactive species can be an electroactive inorganic complex, for example an alkali metal-transition metal oxide or an alkali metal-transition metal phosphate of the formula $$YM^1X$$

wherein Y is Li, Na, or K; $M^1$ is Ni, Co, Mn, Al, Ti, Mo, Fe, V, Si, or a combination thereof; and X is $O_2$ or $PO_4$. In an aspect, the second electroactive species can be $LiFePO_4$.

In an aspect, the second electroactive species of the complementary electroactive layer includes a metallocene. An example of a suitable metallocene can include, but is not limited to ferrocene, or a polymer including repeating units derived from ferrocene (e.g., polyvinyl ferrocene), or derivatives thereof.

During operation of the electrochemical cell, the second electroactive species of the complementary electroactive layer can serve as a source of electrons for the reduction of the electroactive active species of the first electrode. Likewise, the second electroactive species of the complementary electroactive layer can serve as a sink for electrons during the oxidation of the electroactive species of the first electrode.

In an aspect, the second electrode can further comprise a substrate, which can be positioned proximate to or between complementary electroactive layers. The substrate can be in direct or indirect contact with the complementary electroactive layer or layers. When present, the substrate can include, for example, carbon paper (treated, TEFLON-treated, or untreated), carbon cloth, nonwoven carbon mat, or a nonwoven carbon nanotube mat. In an aspect, the substrate of the second electrode can be a conductive material and act as a current collector within the electrochemical cell.

In an aspect, the first electrode can be a negative electrode, and the second electrode can be a positive electrode. The terms negative electrode and positive electrode are used for convenience and clarity, although they may be technically accurate only when the Lewis acid gas is being acquired or released.

In an aspect, the second electrode can be positioned between first electrodes. Each of the first electrodes can comprise the disclosed electroactive species (e.g., comprising the stabilizing group) in a reduced state and a non-aqueous electrolyte. In an aspect the first electrodes and/or second electrodes can be identical in configuration or composition.

In an aspect, the electrochemical cell includes a single separator, disposed between the first electrode and the second electrode, e.g., between the negative electrode and the positive electrode. Electrochemical cells can be combined to make a stack in any suitable combination of parallel and series configurations. In an aspect, the electrochemical cell can comprise more than one separator. For example, one of skill in the art would understand that depending on the selected combination of series and parallel configurations, a single separator may be used, or a plurality of separators may be preferred.

The electrochemical cell can optionally further comprise a gas permeable layer. The gas permeable layer can be positioned adjacent to the first electrode, on a side opposite the separator. The gas permeable layer can comprise a conductive solid material and act as a current collector within the cell. The gas permeable layer can comprise a porous material. In an aspect, the gas permeable layer has a porosity, for example, of greater than or equal to 60%, greater than or equal to 70%, greater than or equal to the 75%, greater than or equal to 80%, or greater. In an aspect, the gas permeable layer has a porosity of less than or equal to 85%, less than or equal to 90%, or more. Combinations of these ranges are possible. For example, in an aspect, the gas permeable layer of the first electrode has a porosity of greater than or equal to 60% and less than or equal to 90%. Other porosities are also possible. Examples of suitable materials for the gas permeable layer include, without limitation, carbon paper (treated, TEFLON-treated, or untreated), carbon cloth, and nonwoven carbon mat.

The electrochemical cell may optionally include a gas flow field. The gas flow field, when present, may be positioned adjacent to the gas permeable layer, on a side opposite the first electrode. When the gas permeable layer is not present in the electrochemical cell, the gas flow field may be positioned adjacent to the first electrode, on a side opposite the separator.

The electrochemical cell can be particularly useful for the separation of a Lewis acid gas from a fluid mixture when the fluid mixture is contacted with the electrochemical cell, and thus is particularly well suited for use in a gas separation system. The gas separation system includes a plurality of electrochemical cells in fluid communication with a gas inlet and a gas outlet.

The fluid mixture, also referred to as the input gas, can be at least partially separated upon exposure to the electrochemical cell. The fluid mixture can be, for example, ambient air (e.g., air from an ambient environment, such as outdoor air). In an aspect, the gas separation system can be used for direct air capture. The systems and methods described herein can be useful for removing a Lewis acid gas such as carbon dioxide directly from ambient air (e.g., to reduce greenhouse gas levels), without the need for any pre-concentration step. Certain aspects of the present disclosure can make the systems and methods described herein particularly useful for direct air capture (e.g., an ability to bond with a Lewis acid gas while being thermodynamically disfavored from reacting with major components of ambient air, such as oxygen).

In an aspect, the concentration of the Lewis acid gas in the fluid mixture is relatively low, for example when the fluid mixture is ambient air. For example, the concentration of the Lewis acid gas in the fluid mixture prior to exposure to the electrochemical cell can be less than or equal to 500 ppm, or less than or equal to 450 ppm, or less than or equal to 400 ppm, or less than or equal to 350 ppm, or less than or equal to 300 ppm, or less than or equal to 200 ppm. In an aspect, the concentration of the Lewis acid gas in the fluid mixture can be as low as 100 ppm, or as low as 50 ppm, or as low as 10 ppm.

In an aspect, the fluid mixture (e.g., input fluid mixture) is ventilated air. The ventilated air can be air in an enclosed or at least partially enclosed place (e.g., air being circulated in an enclosed place). Examples of places in which the fluid mixture (e.g., ventilated air) can be located include, but are not limited to sealed buildings, partially ventilated places, car cabins, inhabited submersibles, air crafts, and the like.

The concentration of Lewis acid gas in the ventilated air can be greater than ambient air but lower than concentrations typical for industrial processes. In an aspect, the concentration of the Lewis acid gas in the fluid mixture prior to exposure to the electrochemical cell is less than or equal to 5,000 ppm, or less than or equal to 4,000 ppm, or less than or equal to 2,000 ppm, or less than or equal to 1,000 ppm.

In an aspect, the concentration of the Lewis acid gas in the fluid mixture (e.g., when it is ventilated air/air in enclosed spaces) is as low as 1,000 ppm, or as low as 800 ppm, or as low as 500 ppm, or as low as 200 ppm, or as low as 100 ppm, or as low as 10 ppm.

In an aspect, the fluid mixture includes oxygen gas ($O_2$). In an aspect, the fluid mixture has a relatively high concentration of oxygen gas (e.g., prior to exposure to the electrochemical cell). Certain aspects of the systems and methods described herein (e.g., the choice of particular electroactive species, methods of handling gases in the system, etc.) can contribute to an ability to capture Lewis acid gases in fluid mixtures in which oxygen gas is present without deleterious interference. In an aspect, oxygen gas is present in the fluid mixture (e.g., prior to exposure to the electrochemical cell) at a concentration of greater than or equal to 0 vol %, or greater than or equal to 0.1 vol %, or greater than or equal to 1 vol %, or greater than or equal to 2 vol %, or greater than or equal to 5 vol %, or greater than or equal to 10 vol %, or greater than or equal to 20 vol %, or greater than or equal to 50 vol %, or greater than or equal to 75 vol %, or greater than or equal to 90 vol %, greater than or equal to 95 vol %. In an aspect, oxygen gas is present in the fluid mixture at a concentration of less than or equal to 99 vol %, or less than or equal to 95 vol %, or less than or equal to 90 vol %, or less than or equal to 75 vol %, or less than or equal to 50 vol %, or less than or equal to 25 vol %, or less than or equal to 21 vol %, or less than or equal to 10 vol %, or less than or equal to 5 vol %, or less than or equal to 2 vol %.

In an aspect, the fluid mixture includes water vapor. The fluid mixture can comprise water vapor for example, because it is or includes ambient air or ventilated air. In an aspect, the fluid mixture (e.g., prior to exposure to the electrochemical cell) has a relatively high relative humidity. For example, in an aspect, the fluid mixture can have a relative humidity of greater than or equal to 0%, or greater than or equal to 5%, or greater than or equal to 10%, or greater than or equal to 25%, or greater than or equal to 50%, or greater than or equal to 75%, or greater than or equal to 90% at least one temperature in the range of −50 to 140° C. In an aspect, the fluid mixture can have a relative humidity of less than or equal to 100%, or less than or equal to 95%, or less than or equal to 90%, or less than or equal to 75%, or less than or equal to 50%, or less than or equal to 25%, or less than or equal to 10% at least one temperature in the range of −50 to 140° C.

The Lewis acid gas can be separated from the fluid mixture in the gas separation system by applying a potential difference across the electrochemical cells of the gas separation system. One of ordinary skill, with the benefit of this disclosure, would understand how to apply a potential across the electrochemical cell. For example, the potential can be applied by connecting the negative electrode and the positive electrode to a suitable power source capable of polarizing the negative and positive electrodes. In an aspect the power supply can be a DC voltage. Nonlimiting examples of a suitable power source include batteries, power grids, regenerative power supplies (e.g., wind power generators, photovoltaic cells, tidal energy generators), generators, and the like, and combinations thereof.

The potential difference can be applied to the electrochemical cells during at least a portion of the time that a fluid mixture is exposed to the electrochemical cell. In an aspect, the potential difference can be applied prior to exposing the fluid mixture to the electrochemical cell.

Application of a potential difference to the electrochemical cell, during a charging mode, results in a redox reaction at the negative electrode wherein the electroactive species is reduced. As discussed herein, the electroactive species is selected for having a greater affinity for the Lewis acid gas when it is in a reduced state relative to when it is in an oxidized state. By reducing the electroactive species and passing a fluid mixture across the first electrode, the Lewis acid gas can bond to the electroactive species forming an anion adduct. Advantageously, the presence of the stabilizing group on the electroactive species can favor the formation of the anion adduct (e.g., by stabilizing the anion adduct through ionic interactions, hydrogen bonding, inductive effects, or a combination thereof). In this way the Lewis acid gas can be removed from the fluid mixture to provide a treated fluid mixture (e.g., including a lesser amount of the Lewis acid gas relative to the initial fluid mixture).

The potential difference applied across the electrochemical cell during the charge mode can have a particular voltage. The potential difference applied across the electrochemical cell can depend, for example, on the reduction potential for the generation of at least one reduced state of the first electroactive species, as well as the standard potential for the interconversion between a reduced state and an oxidized state of the electroactive species in the second electrode. The voltage further includes the current multiplied by the stack electrochemical resistance. In an aspect, the potential difference is at least 0 V, or at least 0.1 V, or at least 0.2 V, or at least 0.5 V, or at least 0.8 V, or at least 1.0 V, or at least 1.5 V. In an aspect, the potential difference is less than or equal to 2.0 V, or less than or equal to 1.5 V, or less than or equal to 0.5 V, or less than or equal to 0.2 V.

In an aspect, the electroactive species comprising the stabilizing group of the first electrode includes a quinone and can be reduced to at least one of its reduced states. When the electroactive species comprising the stabilizing group of the first electrode is reduced in the presence of a Lewis acid gas, for example carbon dioxide, the reduced form of the electroactive species can bond with the carbon dioxide.

In an aspect, while the electroactive species comprising the stabilizing group is reduced at the first electrode, a second electroactive species (e.g., a redox active polymer such as polyvinyl ferrocene) is being oxidized at the second electrode. During the charge mode, the oxidation of the second electroactive species provides a source of electrons for driving the reduction of the first electroactive species.

While the exemplary reaction described above takes place in one direction, it will be understood that some reversibility can be exhibited. Analogous reaction can take place with different electroactive species, as would be understood by a person of ordinary skill in the art.

In an aspect, a relatively large amount of the Lewis acid gas is removed from the fluid mixture during the processes described herein. Removing a relatively large amount of the Lewis acid gas can, in some cases, be beneficial for any of a variety of applications, such as capturing gases that can be deleterious if released into the atmosphere for environmental reasons. For example, the Lewis acid gas can comprise carbon dioxide, and removing a relatively high amount of the carbon dioxide from fluid mixture can be beneficial to either limit the greenhouse gas impact of a process (e.g., an industrial process or transportation process) or to even reduce the amount of carbon dioxide in a room or the atmosphere (either for thermodynamic reasons for heating and air conditioning processes or for environmental reasons).

In an aspect, the amount of Lewis acid gas in a treated fluid mixture (e.g., a fluid mixture from which an amount of the Lewis acid gas is removed upon being exposed to the electrochemical cell) is less than or equal to 50%, less than or equal to 25%, less than or equal to 10%, less than or equal to 5%, less than or equal to 2%, less than or equal to 1%, less than or equal to 0.5%, less than or equal to 0.1% of the amount (in vol %) of the Lewis acid gas in the original fluid mixture prior to treatment (e.g., the amount of the target in the fluid mixture prior to being exposed to electrochemical cell). In an aspect, the amount of Lewis acid gas in a treated fluid mixture is greater than or equal to 0.001%, greater than 0.005%, greater than or equal to 0.01%, greater than or equal to 0.05%, greater than or equal to 0.1%, greater than or equal to 0.5%, greater than or equal to 1%, greater than or equal to 2%, greater than or equal to 5% of the amount (in vol %) of the Lewis acid gas in the original fluid mixture prior to treatment.

In an aspect, a second potential difference can be applied across the electrochemical cell after at least a portion of the Lewis acid gas is bonded to the electroactive species. The second potential difference can be different than the first potential difference. In an aspect, applying the second potential difference results in a step of releasing a portion or all of the Lewis acid gas bonded with the electroactive species to produce a second treated fluid mixture. The second treated fluid mixture can have a greater amount of the Lewis acid gas than the input fluid mixture. For example, Lewis acid gas may be present in the second treated fluid mixture in an amount such that its vol % is 10% greater, 20% greater 50% greater, 100% greater, 200% greater, 1,000% greater, and/or up to 2,000% greater, 5,000% greater, 10,000% greater, or more than the amount of Lewis acid gas in the input fluid mixture.

In an aspect, a mixture of the electroactive species comprising the stabilizing group (e.g., the electroactive species comprising the quinone core and the stabilizing group attached thereto, a polymer or oligomer derived therefrom, a polymer or oligomer derived from a quinone-containing electroactive species and a stabilizing group-containing species, or a combination thereof) and an electrolyte (e.g., a non-aqueous electrolyte), herein known as the "electrolyte solution", is brought in contact with the first electrode in the first electrode chamber (half-cell) of the electrochemical cell, where the electroactive species in the electrolyte solution is reduced (activated). The electrolyte solution is also brought in contact with the fluid mixture of Lewis acid gas either simultaneously in the first electrode chamber during the reduction process, or subsequent to the reduction process, in a liquid-gas contactor. Upon this contact, the electroactive species is bonded with and captures the Lewis acid gas to form the anion adduct. The electrolyte solution is then brought into the second half cell of the electrochemical cell, where it is contacted with a second electrode at an oxidizing potential, and the Lewis acid gas is released.

The gas separation system can comprise an external circuit connecting the negative electrode and the positive electrode of each electrochemical cell to a power source configured to apply a potential difference across the negative electrode (anode) and the positive electrode (cathode) of each electrochemical cell. Each of the electrochemical cells of the gas separation system can be as described above. The electrochemical cells of the gas separation system can be stacked according to various configurations that are generally known in the art, including parallel or in series.

In an aspect, a gas separation system includes a first set of electrochemical cells and a second set of electrochemical cells. Each of the first set and the second set can comprise one or more electrochemical cells as described throughout this disclosure. The first and second set can be made to run in parallel in an alternating fashion, such that one set of cells is operating in a charge mode and capturing a Lewis acid gas (e.g., $CO_2$) from a fluid mixture while another set of cells is operating in a discharge mode and releasing the Lewis acid gas (e.g., $CO_2$). In another aspect, multiple sets of electrochemical cells can be operated in parallel in various stages of charge and discharge mode. Such a configuration can be optimized for the speed of charge and discharge mode (e.g., several sets of cells can be in various stages of capture mode while one set of cells is in discharge mode). Further, the system can comprise separate housings for each of the sets of electrochemical cells. The system can further comprise conduits and valving arranged to direct flow in a desired manner. The gas separation system can allow for nearly continuous separation of a fluid mixture (e.g., gas stream), with the fluid mixture being directed to the set of cells operating in a charge/capture mode, at a given moment, while a separate Lewis acid gas-rich treated mixture is produced by the other set of cells operating in a discharge/release mode. Furthermore, additional sets of electrochemical cells may be added in parallel or in series, according to the needs of the application.

In another aspect, the electroactive species comprising the stabilizing group and a non-aqueous electrolyte are combined to form an "electrolyte solution" that can be contacted with the first electrode in a first electrode chamber (or half-cell) of the electrochemical cell, wherein the electroactive species in the electrolyte solution is in a reduced state. The electrolyte solution can be contacted with the fluid mixture comprising the Lewis acid gas using a liquid/gas contactor simultaneously in the first electrode chamber during the reduction process, or the electrolyte solution can be contacted with the fluid mixture comprising the Lewis acid gas using a liquid/gas contactor subsequent to the reduction process. Upon this contacting step, the electroactive species is bonded with and "captures" the Lewis acid gas to form the anion adduct. The electrolyte solution can then be transferred into a second chamber (or half-cell) of the electrochemical cell and contacted with a second electrode at an oxidizing potential, thereby releasing the "captured" Lewis acid gas.

The fluid mixture (e.g., a gas stream such as an input gas stream) can be introduced to the gas separation system at a particular flow rate. In an aspect, the flow rate can be greater than or equal to 0.001 liters per second (L/s), greater than or equal to 0.005 L/s greater than or equal to 0.01, greater than or equal to 0.05 L/s, greater than or equal to 0.1 L/s, greater than or equal to 0.5 L/s, greater than or equal to 1 L/s, greater than or equal to 5 L/s, greater than or equal to 10 L/s, greater than or equal to 10 50 L/s, or greater than or equal to 100 L/s. In an aspect, the flow rate of the fluid mixture (e.g., a gas stream such as an input gas stream) can be less than or equal to 500 L/s, less than or equal to 400 L/s, less than or equal to 300 L/s, less than or equal to 200 L/s, less than or equal to 100 L/s, less than or equal to 50 L/s, less than or equal to 10 L/s, less than or equal to 1 L/s, less than or equal to 0.5 L/s, or less than or equal to 0.1 L/s.

In an aspect, during or after the step of releasing the Lewis acid gas, the method further includes applying a vacuum condition to the electrochemical cell to remove at least a portion or all of the released Lewis acid gas from the electrochemical cell. One of ordinary skill, with the benefit of this disclosure, would understand suitable techniques and equipment for applying a vacuum condition to the electrochemical cell. For example, a vacuum pump can be fluidically connected to a gas outlet of the electrochemical cell. The vacuum pump can be operated to produce a negative pressure differential between the electrochemical cell bed and a downstream location. This vacuum condition can provide a force sufficient to cause Lewis acid gas released during the releasing step described above to flow out of the electrochemical cell. The vacuum condition can be applied such that the pressure inside the electrochemical cell during or after the releasing of the Lewis acid gas is less than or equal to 760 torr, less than or equal to 700 torr, less than or equal to 500 torr, less than or equal to 100 torr, less than or equal to 50 torr, less than or equal to 10 torr, and/or as low as 5 torr, as low as 1 torr, as low as 0.5 torr, as low as 0.1 torr.

Various components of a system, such as the electrodes (e.g., negative electrode, positive electrode), power source, separator, container, circuitry, insulating material, and the like can be fabricated by those of ordinary skill in the art from any of a variety of components. Components can be molded, machined, extruded, pressed, isopressed, printed, infiltrated, coated, in green or fired states, or formed by any other suitable technique.

The electrodes described herein (e.g., negative electrode, positive electrode) can be of any suitable size or shape. Non-limiting examples of shapes include sheets, cubes, cylinders, hollow tubes, spheres, and the like. The electrodes may be of any suitable size, depending on the application for which they are used (e.g., separating gases from ventilated air, direct air capture, or the like). Additionally, the electrode can comprise a means to connect the electrode to another electrode, a power source, and/or another electrical device. Those of ordinary skill in the art are readily aware of techniques for forming components of the system herein.

Various electrical components of the system may be in electrical communication with at least one other electrical component by a means for connecting. A means for connecting can be any material that allows the flow of electricity to occur between a first component and a second component. A non-limiting example of a means for connecting two electrical components is a wire including a conductive material (e.g., copper, silver, or the like). In an aspect, the system can comprise electrical connectors between two or more components (e.g., a wire and an electrode). In an aspect, a wire, electrical connector, or other means for connecting can be selected such that the resistance of the material is low. In an aspect, the resistance can be substantially less than the resistance of the electrodes, electrolyte, or other components of the system.

Electrochemical cells and gas separation systems of the present disclosure can further be as described in U.S. patent application Ser. Nos. 16/659,398 and 17/665,815, and International Application Number PCT/US2021/59048 the contents of each of which are incorporated by reference in their entirety for all purposes.

The electrochemical cells, systems, and methods described herein can be implemented in a variety of applications. The number of electrochemical cells or sets of cells can be scaled to the requirements of a particular application as needed. The following aspects provide several non-limiting examples of applications. In an aspect, the systems and methods described herein can be for removing a Lewis acid gas (e.g., $CO_2$) from ambient air, as well as enclosed spaces such as airtight building, car cabins—reducing the heating cost of incoming air for ventilation—and submarines and space capsules, where an increase in $CO_2$ levels could be catastrophic. In aspects directed to the electrical power industry, they can be used for capturing carbon dioxide post-combustion at varying concentrations. In an aspect, the systems and methods are suitable for separating Lewis acid gases from industrial flue gas or industrial process gas. Also, they can be used for capturing sulfur dioxide and other gases from flue gas. In aspects directed to the oil and gas industry, the disclosed systems and methods can be used for capturing carbon dioxide and other gases from various processes and diverting them for downstream compression or processing. The disclosed systems and methods can be applied to capture carbon dioxide from burning natural gas used to heat the greenhouses in mild and cold climates, then diverting the captured dioxide into the greenhouse for the plants to use in photosynthesis, i.e., to feed the plants.

This disclosure is further illustrated by the following examples, which are non-limiting.

EXAMPLES

Electroactive species used for the examples were prepared according to the following synthetic procedures.

Synthesis of
2,3-bis(4-dimethylaminopyridinium)-naphthoquinone triflate (NQ-DMAP)

An oven-dried septum-cap vial with a stirbar was charged under nitrogen with 2,3-diiodonaphthoquinone (100 mg, 0.24 mmol), to which anhydrous DMSO (2 mL) was added. A separate oven-dried septum-cap vial was charged under nitrogen with 4-dimethylaminopyridine (DMAP) (65 mg, 0.54 mmol), to which anhydrous DMSO (1 mL) was added. When both materials had fully dissolved, the DMAP solution was added slowly by syringe to the stirring quinone solution. The reaction mixture was stirred at room temperature for 15 minutes, and then silver triflate (154 mg, 0.60 mmol) was added as a solid. The resulting suspension was stirred for a further 5 minutes then transferred to a centrifuge tube and centrifuged (4000 rpm, 5 minutes). The orange supernatant was removed by pipette and added to 9 mL 2:1 chloroform:diethyl ether; the resulting suspension was centrifuged (4000 rpm, 10 minutes) and the supernatant removed. The pellet was redispersed in 6 mL chloroform, centrifuged again, and the resulting pellet dried under reduced pressure to give 2,3-bis(4-dimethylaminopyridinium)-naphthoquinone triflate (NQ-DMAP) as a yellow-orange powder.

Synthesis of
2,3-bis(3-hydroxyphenyl)-naphthoquinone (NQ-PhOH)

A 50 mL round bottom flask with a stirbar was charged under air with $K_3PO_4$ (930 mg, 4.4 mmol), 3-hydroxyphenylboronic acid (242 mg, 1.75 mmol) and water (8 mL), and set stirring for 20 minutes at room temperature to dissolve. A solution of 2,3-diiodonaphthoquinone (300 mg, 0.73 mmol) in dioxane (12 mL) was added by pipette, followed by $Pd(OAc)_2$ (8 mg). The reaction mixture was stirred at room temperature for 3 hours, then transferred to a separatory funnel with dichloromethane and neutralized with 1M HCl. The aqueous phase was extracted twice with dichloromethane, the combined organic phases were washed with water and dried over MgSO4, and the solvent was removed under reduced pressure. The crude material was purified by column chromatography (silica; 20% ethyl acetate in hexanes) to yield 2,3-bis(3-hydroxyphenyl)-naphthoquinone (NQ-PhOH) as a bright yellow powder.

Example 1

NQ-DMAP was deposited on carbon paper and tested in an electrochemical cell to determine the effect of the presence of the cationic stabilizing groups. The electrolyte used in the electrochemical cell was 0.15 M $MgTFSI_2$ in tetraethylene glycol dimethyl ether. The counter electrode used with poly(vinyl ferrocene), and the gas mixture flowed through the cell was 1% carbon dioxide in air.

FIG. 1 shows the structure of NQ-DMAP and a graph of one cycle of $CO_2$ capture and release (orange trace) at very mild applied potential (blue trace). FIG. 1 illustrates the excellent $CO_2$ binding ability for NQ-DMAP, an electron deficient quinone. This result is also illustrative of the influence of the cationic groups, enabling $CO_2$ capture in air with minimal reduction in 02 concentration (gray trace).

Example 2

Figure 2A:
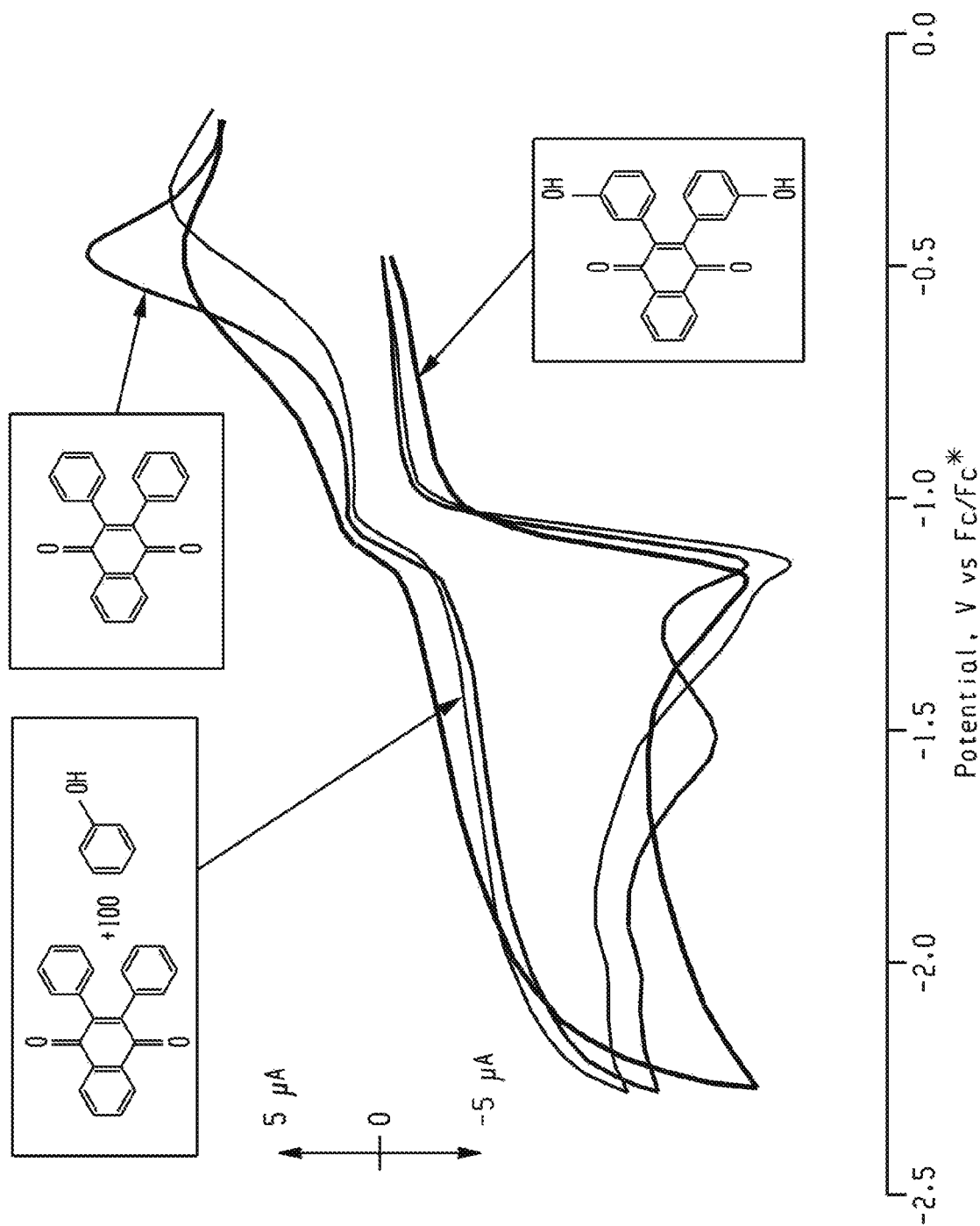
FIG. 2A is a graph of current (Amperes, A) versus potential (Volts, V vs. ferrocene ($Fc/Fc^+$)) and shows overlaid cyclic voltammograms as described in Example 2.
Figure 2B:
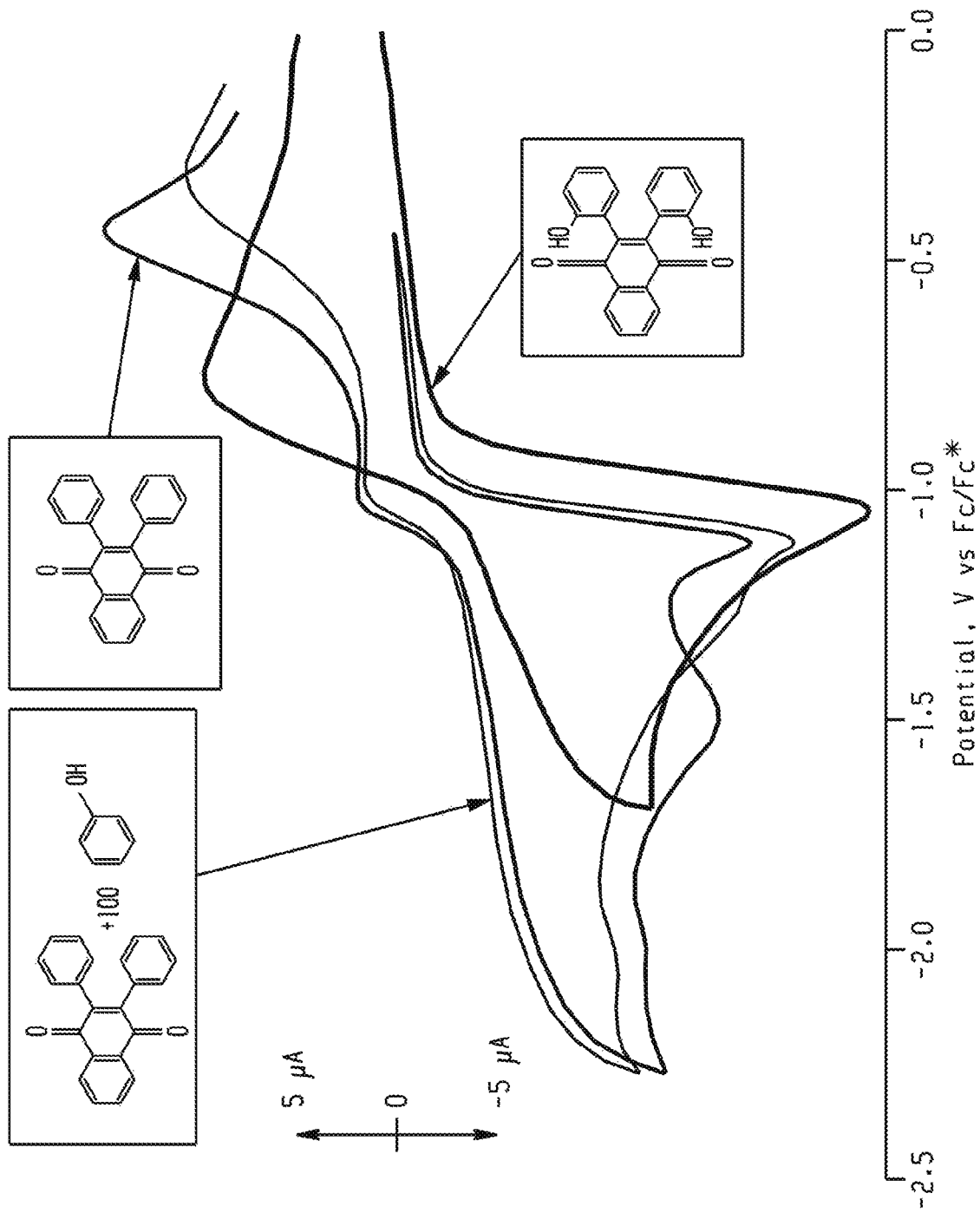
FIG. 2B is a graph of current (Amperes, A) versus potential (Volts, V vs. ferrocene (Fc/Fc$^+$)) and shows overlaid cyclic voltammograms as described in Example 2.

Cyclic voltammetry was used to illustrate the effect of intramolecular hydrogen bonding on $CO_2$ binding kinetics for NQ-PhOH. The results are shown in FIG. 2. For a comparable molecule lacking an intramolecular hydrogen bond donor, $CO_2$ binding was observed to be slow until the compound is doubly reduced, resulting in the observed separated reduction waves. The corresponding intramolecular H-bond donor compound (with a hydroxyl group in the 3 position, FIG. 2A) exhibited a "peak merging" effect (reductive wave), indicative of the improved $CO_2$ binding kinetics enabled by the intramolecular hydrogen bond stabilization of the $CO_2$ adduct to the quinone. This effect was observed to match or exceed any kinetic enhancement observed when 100 equivalents of a comparable hydrogen bond donor (e.g., phenol of NQ-PhOH) was added to the comparative molecule lacking the hydrogen bond donor group. Interestingly, the corresponding intramolecular H-bond donor compound with the hydroxyl group in the 2 position (FIG. 2B) also exhibited a "peak merging" effect (reductive wave) but did not exhibit the electrochemical irreversibility indicative of $CO_2$ binding by the reduced species. This suggests that the 2-substitution offers a kinetic enhancement but a thermodynamic impediment to $CO_2$ binding, in contrast with the enhancement observed for the 3-substituted derivative. This illustrates the importance of balancing stabilization of the $CO_2$ adduct versus stabilization of the reduced species, which is possible through intramolecular functionalization.

This disclosure further encompasses the following aspects.

Aspect 1: An electroactive species comprising a quinone core structure and at least one stabilizing group covalently bound thereto; wherein the stabilizing group comprises a cationic group, a hydrogen bond donor, or a combination thereof; wherein the electroactive species comprises an oxidized state, and at least one reduced state capable of bonding with a Lewis acid gas to form an anion adduct between the Lewis acid gas and the reduced electroactive species; and wherein the presence of the stabilizing group kinetically favors the forming the anion adduct from the reduced electroactive species and the Lewis acid gas, or thermodynamically favors forming the anion adduct in a thermodynamic equilibrium between the anion adduct and the reduced electroactive species, or kinetically favors forming the anion adduct from the reduced electroactive species and thermodynamically favors the forming of the anion adduct in the thermodynamic equilibrium between the anion adduct and the reduced electroactive species.

Aspect 2: The electroactive species of aspect 1, wherein the quinone core structure is of formula (I) or (II)

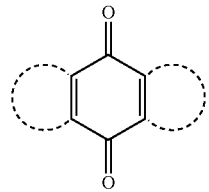
(I)

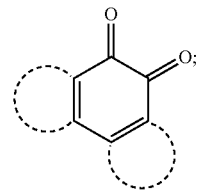
(II)

wherein the dashed lines of formula (I) and (II) indicate the optional presence of additional substituted or unsubstituted aryl groups; and the stabilizing group A is covalently bound to the quinone core structure via a linking group -(L)$_z$-, wherein z is 0 or 1, provided that z is 1 when A is the hydrogen bond donor.

Aspect 3: The electroactive species of aspect 1 or 2, wherein the electroactive species is of formula (VI) to (X), or a combination thereof:

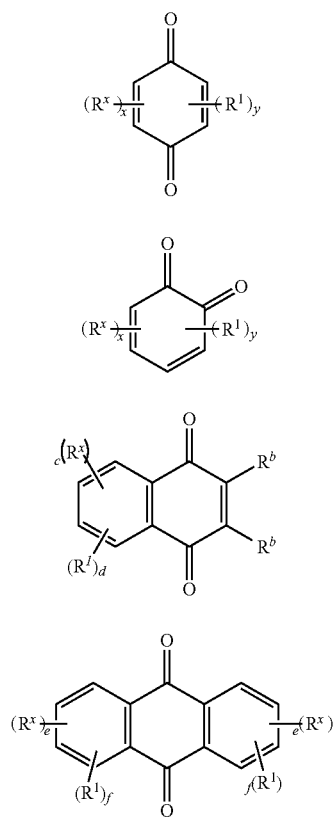

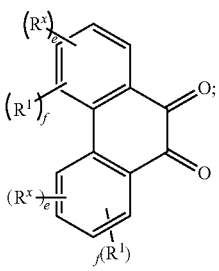

wherein each $R^1$ is independently at each occurrence hydrogen, halogen, a substituted or unsubstituted $C_{1-30}$ alkyl group, a substituted or unsubstituted $C_{1-30}$ alkoxy group, a poly($C_{1-30}$ alkylene oxide) group; a substituted or unsubstituted $C_{3-30}$ cycloalkyl group, a substituted or unsubstituted $C_{6-30}$ aryl group, a substituted or unsubstituted $C_{2-30}$ heteroaryl group, a nitrile group, a nitro group, a thiol group, or a vinyl group; each $R^x$ is independently at each occurrence the group -(L)$_z$-A; x is independently at each occurrence 1 to 4; y is independently at each occurrence 0 to 3, provided that the sum of x and y is 4; $R^b$ is independently at each occurrence R or $R^x$; e is independently at each occurrence 0 to 4, provided that at least one occurrence of e is 1, f is independently at each occurrence 0 to 4, provided that the sum of each e-f pair is 4; and c and d are each independently 0 to 4, provided that the sum of c and d is 4, and provided that when c is 0, at least one of $R^b$ is $R^x$.

Aspect 4: The electroactive species of any of aspects 1 to 3, wherein the cationic group comprises a substituted or unsubstituted $C_{1-6}$ alkyl ammonium group, a substituted or unsubstituted $C_{1-6}$ alkyl phosphonium group, a substituted or unsubstituted $C_{7-30}$ arylalkyl ammonium group, a chelated metal cation, a substituted or unsubstituted anilinium group, a substituted or unsubstituted pyridinium group, or a substituted or unsubstituted imidazolium group, preferably a substituted or unsubstituted $C_{1-6}$ alkyl ammonium group, a substituted or unsubstituted benzyl ammonium group, a substituted or unsubstituted pyridinium group, or a substituted or unsubstituted imidazolium group; and the hydrogen bond donor comprises a hydroxyl group, a carboxylic acid group, an amine group, an aniline group, an amide group, or a thiol group, preferably a hydroxyl group.

Aspect 5: The electroactive species of aspect 3 or 4, wherein the electroactive species is a compound of formula (VI).

Aspect 6: The electroactive species of aspect 3 or 4, wherein the electroactive species is a compound of formula (VII).

Aspect 7: The electroactive species of aspect 3 or 4, wherein the electroactive species is a compound of formula (VIII).

Aspect 8: The electroactive species of aspect 7, wherein c is 0; d is 4; and at least one occurrence of $R^b$ is -(L)$_z$-A, wherein z is 1; L is a substituted or unsubstituted phenylene group; and A is a —$NR^2R^3R^4$ ammonium group, wherein $R^2$, $R^3$ and $R^4$ are independently at each occurrence a substituted or unsubstituted $C_{1-6}$ alkyl group or a substituted or unsubstituted benzyl group, or a hydroxyl group.

Aspect 9: The electroactive species of aspect 7 or 8, wherein both occurrences of $R^b$ are -(L)$_z$-A, wherein each occurrence of z is 1 and each occurrence of L is a substituted or unsubstituted phenylene group.

Aspect 10: The electroactive species of any of aspects 7 to 9, wherein A is the —NR$^2$R$^3$R$^4$ ammonium group, preferably, wherein each of R$^2$, R$^3$ and R$^4$ are methyl; and R$^1$ is hydrogen.

Aspect 11: The electroactive species of any of aspects 7 to 9, wherein A is a hydroxyl group, an amine group, an amide group, or a thiol group, preferably a hydroxyl group; and R$^1$ is hydrogen.

Aspect 12: The electroactive species of aspect 7, wherein c is 0; d is 4; at least one occurrence of R$^b$ is -(L)$_z$-A wherein z is 0; and A is a substituted or unsubstituted pyridinium group.

Aspect 13: The electroactive species of aspect 7, wherein c is 0; d is 4; at least one occurrence of R$^b$ is -(L)$_z$-A wherein z is 0; and A is a substituted or unsubstituted imidazolium group.

Aspect 14: The electroactive species of aspect 7, wherein c is 2; d is 2; R$^b$ is independently at each occurrence hydrogen or a substituted or unsubstituted phenyl group; R$^x$ is independently at each occurrence -(L)$_z$-A wherein z is 0; and A is a —NR$^2$R$^3$R$^4$ ammonium group, wherein R$^2$, R$^3$ and R$^4$ are independently at each occurrence a substituted or unsubstituted C$_{1-6}$ alkyl group or a substituted or unsubstituted benzyl group, or a hydroxyl group; preferably, wherein the R$^x$ groups are positioned para relative to one another.

Aspect 15: The electroactive species of aspect 3 or 4, wherein the electroactive species is a compound of formula (IX).

Aspect 16: The electroactive species of aspect 15, wherein each occurrence of e is 1, each occurrence of f is 3, each occurrence of R$^x$ is -(L)$_z$-A, wherein A is a —NR$^2$R$^3$R$^4$ ammonium group, wherein R$^2$, R$^3$ and R$^4$ are independently at each occurrence a substituted or unsubstituted C$_{1-6}$ alkyl group or a substituted or unsubstituted benzyl group, or a hydroxyl group, an amine group, an amide group, or a thiol group, preferably a hydroxyl group.

Aspect 17: The electroactive species of aspect 16, wherein A is the —NR$^2$R$^3$R$^4$ ammonium group, preferably, wherein each of R$^2$, R$^3$ and R$^4$ are methyl or R$^2$ and R$^3$ are methyl and R$^4$ is benzyl; and R$^1$ is hydrogen.

Aspect 18: The electroactive species of aspect 15, wherein the electroactive species is a compound of the formula (IXb)

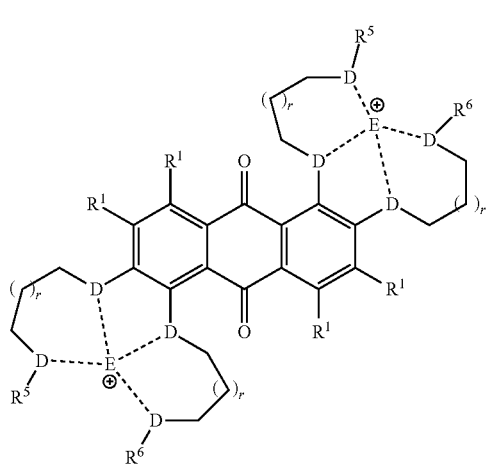

(IXb)

wherein R$^1$ is independently at each occurrence hydrogen, halogen, a C$_{1-30}$ alkyl group, a C$_{1-30}$ alkoxy group, a poly(C$_{1-30}$ alkylene oxide) group; a C$_{3-30}$ cycloalkyl group, a C$_{3-30}$ branched alkyl group, a C$_{6-30}$ aryl group, a C$_{2-30}$ heteroaryl group, a C$_{1-30}$ fluoroalkyl group, a nitrile group, a nitro group, a thiol group, or a vinyl group, preferably hydrogen; D is independently at each occurrence oxygen or nitrogen; r is 0 or 1; R$^5$ and R$^6$ are independently at each occurrence a C$_{1-6}$ alkyl group, a poly(C$_{2-3}$ alkylene oxide) group, or a poly(C$_{2-3}$ alkylene diamine) group, wherein R$^5$ is optionally combined with R$^6$ to form a cyclic group; and E is a metal cation, preferably wherein the metal cation is a Group 1 element, a Group 2 element, a rare earth element, a Group 11 element, a Group 12 element, a Group 13 element, or a combination thereof; more preferably wherein the metal cation is Li, Ca, Sc, La, Al, Zn, Mg, Na, K, or a combination thereof.

Aspect 19: The electroactive species of aspect 18, wherein R$^1$ is hydrogen; R$^5$ and R$^6$ are methyl; D is oxygen; and r is 0.

Aspect 20: The electroactive species of aspect 18, wherein R$^1$ is hydrogen; R$^5$ and R$^6$ are methyl; D is nitrogen; and r is 0.

Aspect 21: The electroactive species of aspect 18, wherein R$^1$ is hydrogen; D is oxygen; r is 0; and R$^5$ and R$^6$ are poly(ethylene oxide) groups, wherein R$^5$ and R$^6$ combine to form a cyclic ether.

Aspect 22: The electroactive species of aspect 3 or 4, wherein the electroactive species is of formula (X).

Aspect 23: The electroactive species of aspect 22, wherein A is a —NR$^2$R$^3$R$^4$ ammonium group, preferably, wherein each of R$^2$, R$^3$ and R$^4$ are methyl or benzyl; z is 0; R$^1$ is hydrogen; each occurrence of e is 1; and each occurrence of f is 3.

Aspect 24: The electroactive species of aspect 22, wherein A is a hydroxyl group, an amine group, an amide group, or a thiol group, preferably a hydroxyl group; z is 1; L is a linking group comprising a C$_6$ arylene group; R$^1$ is hydrogen; each occurrence of e is 1; and each occurrence of f is 3.

Aspect 25: The electroactive species of any of aspects 1 to 24, wherein the stabilizing group A is 10 atoms or less, or 8 atoms or less away from at least one ketone group of the electroactive species.

Aspect 26: The electroactive species of any of aspects 1 to 25, wherein the stabilizing group A is 1 to 10 atoms from at least one ketone group of the electroactive species.

Aspect 27: A polymer or oligomer wherein at least a portion of the repeating units comprise the electroactive species of any of aspects 1 to 26.

Aspect 28: A polymer or oligomer comprising repeating units derived from a first monomer comprising a polymerizable group and an electroactive species comprising a quinone core structure, and a second monomer comprising a polymerizable group and a stabilizing group comprising a cationic group, a hydrogen bond donor, or a combination thereof; wherein the electroactive species comprises an oxidized state, and at least one reduced state capable of bonding with a Lewis acid gas to form an anion adduct between the Lewis acid gas and the reduced electroactive species; and wherein the presence of the stabilizing group: kinetically favors the forming the anion adduct from the reduced electroactive species and the Lewis acid gas, or thermodynamically favors forming the anion adduct in a thermodynamic equilibrium between the anion adduct and the reduced electroactive species, or kinetically favors forming the anion adduct from the reduced electroactive species and thermodynamically favors the forming of the anion adduct in the thermodynamic equilibrium between the anion adduct and the reduced electroactive species.

Aspect 29: A method for separating a Lewis acid gas from a fluid mixture comprising the Lewis acid gas, the method comprising: contacting the fluid mixture with the electroactive species of any of aspects 1 to 26 or the polymer or oligomer of aspect 27 or the polymer or oligomer of claim 28, wherein the electroactive species is in a reduced state, to form an anion adduct between the Lewis acid gas and the electroactive species in the reduced state.

Aspect 30: The method of aspect 29, wherein the contacting is in the presence of an electrolyte, preferably a non-aqueous electrolyte.

Aspect 31: The method of aspect 30, wherein the electrolyte comprises an organic electrolyte, an ionic liquid, or a combination thereof, wherein the organic electrolyte comprises an organic solvent and a supporting electrolyte, preferably wherein the organic solvent is acetonitrile, dimethylformamide, propylene carbonate, dimethylsulfoxide, polyethylene glycol, diglyme, or a combination thereof.

Aspect 32: The method of any one of aspects 29 to 31, wherein an association constant between the reduced electroactive species comprising the stabilizing group and the Lewis acid gas is greater than an association constant between the reduced electroactive species not including the stabilizing group and the Lewis acid gas.

Aspect 33: The method of any one of aspects 29 to 32, wherein the forming of the anion adduct from the reduced electroactive species comprising the stabilizing group and the Lewis acid gas is kinetically more favorable than forming an anion adduct from the reduced electroactive species not including the stabilizing group and the Lewis acid gas.

Aspect 34: The method of any one of aspects 29 to 33, wherein the forming of the anion adduct from the reduced electroactive species comprising the stabilizing group and the Lewis acid gas is thermodynamically more favorable than forming an anion adduct from the reduced electroactive species not including the stabilizing group and the Lewis acid gas.

Aspect 35: The method of any one of aspects 29 to 34, wherein the forming of the anion adduct from the reduced electroactive species comprising the stabilizing group and the Lewis acid gas is kinetically and thermodynamically more favorable than forming an anion adduct from the reduced electroactive species not including the stabilizing group and the Lewis acid gas.

Aspect 36: The method of any one of aspects 29 to 31, wherein the stabilizing group is a cationic group, and forming of the anion adduct from the reduced electroactive species comprising the stabilizing group and the Lewis acid gas is kinetically more favorable than forming an anion adduct from a reduced state of a nonionic electroactive species having a reduction potential that is the same as the reduced electroactive species comprising the stabilizing group and the Lewis acid gas; or forming of the anion adduct from the reduced electroactive species comprising the stabilizing group and the Lewis acid gas is thermodynamically more favorable than forming an anion adduct from a reduced state of a nonionic electroactive species having a reduction potential that is the same as the reduced electroactive species comprising the stabilizing group and the Lewis acid gas; or forming of the anion adduct from the reduced electroactive species comprising the stabilizing group and the Lewis acid gas is kinetically and thermodynamically more favorable than forming an anion adduct from a reduced state of a nonionic electroactive species having a reduction potential that is the same as the reduced electroactive species comprising the stabilizing group and the Lewis acid gas.

Aspect 37: The method of any of aspects 29 to 31, wherein the stabilizing group is a cationic group, and an association constant between the reduced electroactive species comprising the stabilizing group and the Lewis acid gas is greater than an association constant between a reduced state of a nonionic electroactive species having a reduction potential that is the same as the reduced electroactive species comprising the stabilizing group and the Lewis acid gas.

Aspect 38: The method of any of aspects 29 to 31, wherein the stabilizing group is a hydrogen bond donor, and forming of the anion adduct from the reduced electroactive species comprising the stabilizing group and the Lewis acid gas is kinetically more favorable than forming an anion adduct from a reduced state of a nonionic electroactive species having a reduction potential that is the same as the reduced electroactive species comprising the stabilizing group and the Lewis acid gas; or forming of the anion adduct from the reduced electroactive species comprising the stabilizing group and the Lewis acid gas is thermodynamically more favorable than forming an anion adduct from a reduced state of a nonionic electroactive species having a reduction potential that is the same as the reduced electroactive species comprising the stabilizing group and the Lewis acid gas; or forming of the anion adduct from the reduced electroactive species comprising the stabilizing group and the Lewis acid gas is kinetically and thermodynamically more favorable than forming an anion adduct from a reduced state of a nonionic electroactive species having a reduction potential that is the same as the reduced electroactive species comprising the stabilizing group and the Lewis acid gas.

Aspect 39: The method of any of aspects 29 to 31, wherein the stabilizing group is a hydrogen bond donor, and an association constant between the reduced electroactive species comprising the stabilizing group and the Lewis acid gas is greater than an association constant between a reduced state of a nonionic electroactive species having a reduction potential that is the same as the reduced electroactive species comprising the stabilizing group and the Lewis acid gas.

Aspect 40: The method of any one of aspects 29 to 39, wherein the Lewis acid gas is $CO_2$, COS, $SO_2$, $SO_3$, $R_2SO_4$, $NO_2$, $NO_3$, $R_3PO_4$, $R_2S$, RCOOR', RCHO, $R'_2CO$, R'NCO, R'NCS, $BR''_3$, $R''_3BO_3$, or a combination thereof, wherein each R is independently hydrogen, $C_{1-12}$ alkyl, $C_{3-12}$ cycloalkyl, $C_{1-12}$ heterocycloalkyl, $C_{6-20}$ aryl, or $C_{1-12}$ heteroaryl; each R' is independently $C_{1-12}$ alkyl, $C_{3-12}$ cycloalkyl, $C_{1-12}$ heterocycloalkyl, $C_{6-20}$ aryl, or $C_{1-12}$ heteroaryl; and each R" is independently hydrogen, halogen, $C_{1-12}$ alkyl, $C_{3-12}$ cycloalkyl, $C_{1-12}$ heterocycloalkyl, $C_{6-20}$ aryl, or $C_{1-12}$ heteroaryl.

Aspect 41: An electrochemical apparatus comprising: a chamber comprising a negative electrode in electronic communication with an electroactive species in a reduced state, and an electrolyte, wherein the chamber is configured to receive a fluid mixture comprising a Lewis acid gas, wherein the electroactive species comprises a quinone core and at least one stabilizing group covalently bound thereto; wherein the stabilizing group comprises a cationic group, a hydrogen bond donor, or a combination thereof; and wherein the electroactive species comprises an oxidized state, and at least one reduced state capable of bonding with a Lewis acid gas to form an anion adduct between the Lewis acid gas and the reduced electroactive species; and wherein the presence of the stabilizing group: kinetically favors the forming the anion adduct from the reduced electroactive species and the Lewis acid gas, or thermodynamically favors forming the anion adduct in a thermodynamic equilibrium between the anion adduct and the reduced electroactive species, or kinetically favors forming the anion adduct from the reduced electroactive species and thermodynamically favors the forming of the anion adduct in the thermodynamic equilibrium between the anion adduct and the reduced electroactive species.

Aspect 42: An electrochemical apparatus comprising: a chamber comprising a negative electrode in electronic communication with an electroactive species in a reduced state, and an electrolyte, wherein the chamber is configured to receive a fluid mixture comprising a Lewis acid gas, wherein the electroactive species comprises a polymer or oligomer according to aspect 27.

Aspect 43: An electrochemical apparatus comprising: a chamber comprising a negative electrode in electronic communication with an electroactive species in a reduced state, and an electrolyte, wherein the chamber is configured to receive a fluid mixture comprising a Lewis acid gas, wherein the electroactive species comprises a polymer or oligomer according to aspect 28.

Aspect 44: A gas separation system, comprising a plurality of electrochemical cells in fluid communication with a gas inlet and a gas outlet, wherein each of the plurality of electrochemical cells comprises: a first electrode comprising an electroactive species in a reduced state wherein the electroactive species comprises an oxidized state and at least one reduced state which bonds with a Lewis acid gas to form an anion adduct; a second electrode comprising a complementary electroactive layer; a first separator between the first electrode and the second electrode; and an electrolyte; wherein the electroactive species comprises a quinone core and at least one stabilizing group covalently bound thereto; wherein the stabilizing group comprises a cationic group, a hydrogen bond donor, or a combination thereof; and wherein the presence of the stabilizing group: kinetically favors the forming the anion adduct from the reduced electroactive species and the Lewis acid gas, or thermodynamically favors forming the anion adduct in a thermodynamic equilibrium between the anion adduct and the reduced electroactive species, or kinetically favors forming the anion adduct from the reduced electroactive species and thermodynamically favors the forming of the anion adduct in the thermodynamic equilibrium between the anion adduct and the reduced electroactive species.

Aspect 45: A gas separation system, comprising a plurality of electrochemical cells in fluid communication with a gas inlet and a gas outlet, wherein each of the plurality of electrochemical cells comprises: a first electrode comprising an electroactive species in a reduced state wherein the electroactive species comprises an oxidized state and at least one reduced state which bonds with a Lewis acid gas to form an anion adduct; a second electrode comprising a complementary electroactive layer; a first separator between the first electrode and the second electrode; and an electrolyte; wherein the electroactive species comprises a polymer or oligomer according to aspect 27.

Aspect 46: A gas separation system, comprising a plurality of electrochemical cells in fluid communication with a gas inlet and a gas outlet, wherein each of the plurality of electrochemical cells comprises: a first electrode comprising an electroactive species in a reduced state wherein the electroactive species comprises an oxidized state and at least one reduced state which bonds with a Lewis acid gas to form an anion adduct; a second electrode comprising a complementary electroactive layer; a first separator between the first electrode and the second electrode; and an electrolyte; wherein the electroactive species comprises a polymer or oligomer according to aspect 28.

The compositions, methods, and articles can alternatively comprise, consist of, or consist essentially of, any appropriate materials, steps, or components herein disclosed. The compositions, methods, and articles can additionally, or alternatively, be formulated so as to be devoid, or substantially free, of any materials (or species), steps, or components, that are otherwise not necessary to the achievement of the function or objectives of the compositions, methods, and articles.

All ranges disclosed herein are inclusive of the endpoints, and the endpoints are independently combinable with each other. "Combinations" is inclusive of blends, mixtures, alloys, reaction products, and the like. The terms "first," "second," and the like, do not denote any order, quantity, or importance, but rather are used to distinguish one element from another. The terms "a" and "an" and "the" do not denote a limitation of quantity and are to be construed to cover both the singular and the plural, unless otherwise indicated herein or clearly contradicted by context. "Or" means "and/or" unless clearly stated otherwise. Reference throughout the specification to "an aspect" means that a particular element described in connection with the aspect is included in at least one aspect described herein and may or may not be present in other aspects. The term "combination thereof" as used herein includes one or more of the listed elements, and is open, allowing the presence of one or more like elements not named. In addition, it is to be understood that the described elements may be combined in any suitable manner in the various aspects.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this application belongs. All cited patents, patent applications, and other references are incorporated herein by reference in their entirety. However, if a term in the present application contradicts or conflicts with a term in the incorporated reference, the term from the present application takes precedence over the conflicting term from the incorporated reference.

Compounds are described using standard nomenclature. For example, any position not substituted by any indicated group is understood to have its valency filled by a bond as indicated, or a hydrogen atom. A dash ("-") that is not between two letters or symbols is used to indicate a point of attachment for a substituent. For example, —CHO is attached through carbon of the carbonyl group.

As used herein, the term "hydrocarbyl," whether used by itself, or as a prefix, suffix, or fragment of another term, refers to a residue that contains only carbon and hydrogen. The residue can be aliphatic or aromatic, straight-chain, cyclic, bicyclic, branched, saturated, or unsaturated. It can also contain combinations of aliphatic, aromatic, straight chain, cyclic, bicyclic, branched, saturated, and unsaturated hydrocarbon moieties. However, when the hydrocarbyl residue is described as substituted, it may, optionally, contain heteroatoms over and above the carbon and hydrogen members of the substituent residue. Thus, when specifically described as substituted, the hydrocarbyl residue can also contain one or more carbonyl groups, amino groups, hydroxyl groups, or the like, or it can contain heteroatoms within the backbone of the hydrocarbyl residue. The term "alkyl" means a branched or straight chain, saturated aliphatic hydrocarbon group, e.g., methyl, ethyl, n-propyl, i-propyl, n-butyl, s-butyl, t-butyl, n-pentyl, s-pentyl, and n- and s-hexyl. "Alkenyl" means a straight or branched chain, monovalent hydrocarbon group having at least one carbon-carbon double bond (e.g., ethenyl (—HC=CH$_2$)). "Alkoxy" means an alkyl group that is linked via an oxygen (i.e., alkyl-O—), for example methoxy, ethoxy, and sec-butyloxy groups. "Alkylene" means a straight or branched chain, saturated, divalent aliphatic hydrocarbon group (e.g., methylene (—CH$_2$—) or, propylene (—(CH$_2$)$_3$—)). "Cycloalkylene" means a divalent cyclic alkylene group, —C$_n$H$_{2n-x}$, wherein x is the number of hydrogens replaced by cyclization(s). "Cycloalkenyl" means a monovalent group having one or more rings and one or more carbon-carbon double bonds in the ring, wherein all ring members are carbon (e.g., cyclopentyl and cyclohexyl). "Aryl" means an aromatic hydrocarbon group containing the specified number of carbon atoms, such as phenyl, tropone, indanyl, or naphthyl. "Arylene" means a divalent aryl group. "Alkylarylene" means an arylene group substituted with an alkyl group. "Arylalkylene" means an alkylene group substituted with an aryl group (e.g., benzyl). The prefix "halo" means a group or compound including one more of a fluoro, chloro, bromo, or iodo substituent. A combination of different halo atoms (e.g., bromo and fluoro), or only chloro atoms can be present. The prefix "hetero" means that the compound or group includes at least one ring member that is a heteroatom (e.g., 1, 2, or 3 heteroatom(s)), wherein the heteroatom(s) is each independently N, O, S, Si, or P. "Substituted" means that the compound or group is substituted with at least one (e.g., 1, 2, 3, or 4) substituents that can each independently be a $C_{1-9}$ alkoxy, a $C_{1-9}$ haloalkoxy, a nitro (—NO$_2$), a cyano (—CN), a $C_{1-6}$ alkyl sulfonyl (—S(=O)$_2$-alkyl), a $C_{6-12}$ aryl sulfonyl (—S(=O)$_2$-aryl), a thiol (—SH), a thiocyano (—SCN), a tosyl (CH$_3$C$_6$H$_4$SO$_2$—), a $C_{3-12}$ cycloalkyl, a $C_{2-12}$ alkenyl, a $C_{5-12}$ cycloalkenyl, a $C_{6-12}$ aryl, a $C_{7-13}$ arylalkylene, a $C_{4-12}$ heterocycloalkyl, and a $C_{3-12}$ heteroaryl instead of hydrogen, provided that the substituted atom's normal valence is not exceeded. The number of carbon atoms indicated in a group is exclusive of any substituents. For example —CH$_2$CH$_2$CN includes a $C_2$ alkyl group (—CH$_2$CH$_3$) substituted with a nitrile (—CN).

While particular aspects have been described, alternatives, modifications, variations, improvements, and substantial equivalents that are or may be presently unforeseen may arise to the inventors or others skilled in the art. Accordingly, the appended claims as filed and as they may be amended are intended to embrace all such alternatives, modifications variations, improvements, and substantial equivalents.

What is claimed is:

1. An electroactive species comprising a quinone core structure and at least one stabilizing group covalently bound thereto;
    wherein the stabilizing group comprises a cationic group, a hydrogen bond donor, or a combination thereof;
    wherein the electroactive species comprises
        an oxidized state, and
        at least one reduced state capable of bonding with a Lewis acid gas to form an anion adduct between the Lewis acid gas and the reduced electroactive species; and
    wherein the presence of the stabilizing group
        kinetically favors the forming the anion adduct from the reduced electroactive species and the Lewis acid gas, or
        thermodynamically favors forming the anion adduct in a thermodynamic equilibrium between the anion adduct and the reduced electroactive species, or kinetically favors forming the anion adduct from the reduced electroactive species and thermodynamically favors the forming of the anion adduct in the thermodynamic equilibrium between the anion adduct and the reduced electroactive species.

2. The electroactive species of claim 1, wherein
the quinone core structure is of formula (I) or (II)

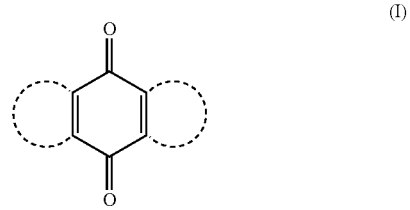

(I)

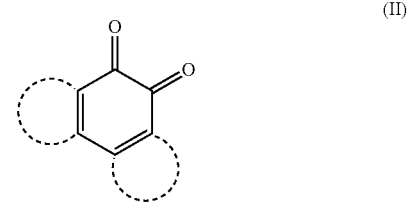

(II)

wherein the dashed lines of formula (I) and (II) indicate the optional presence of additional substituted or unsubstituted aryl groups; and the stabilizing group A is covalently bound to the quinone core structure via a linking group -(L)$_z$-, wherein z is 0 or 1, provided that z is 1 when A is the hydrogen bond donor.

3. The electroactive species of claim 1, wherein the electroactive species is of formula (VI) to (X), or a combination thereof:

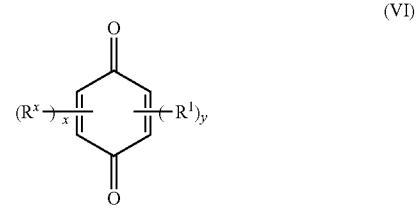

(VI)

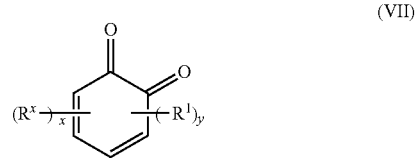

(VII)

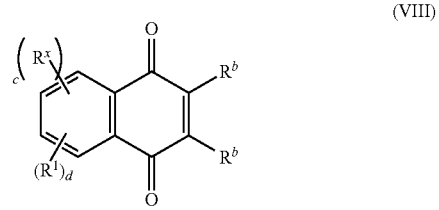

(VIII)

-continued

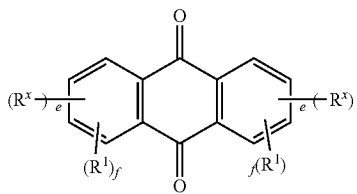
(IX)

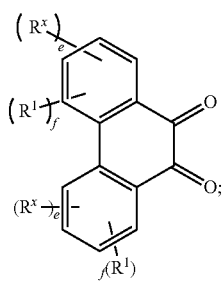
(X)

wherein
each $R^1$ is independently at each occurrence hydrogen, halogen, a substituted or unsubstituted $C_{1-30}$ alkyl group, a substituted or unsubstituted $C_{1-30}$ alkoxy group, a poly($C_{1-30}$ alkylene oxide) group; a substituted or unsubstituted $C_{3-30}$ cycloalkyl group, a substituted or unsubstituted $C_{6-30}$ aryl group, a substituted or unsubstituted $C_{2-30}$ heteroaryl group, a nitrile group, a nitro group, a thiol group, or a vinyl group;

each $R^x$ is independently at each occurrence the group -(L)$_z$-A;

x is independently at each occurrence 1 to 4;

y is independently at each occurrence 0 to 3, provided that the sum of x and y is 4;

$R^b$ is independently at each occurrence $R^1$ or $R^x$;

e is independently at each occurrence 0 to 4, provided that at least one occurrence of e is 1, f is independently at each occurrence 0 to 4, provided that the sum of each e-f pair is 4; and c and d are each independently 0 to 4, provided that the sum of c and d is 4, and provided that when c is 0, at least one of $R^b$ is $R^x$.

4. The electroactive species of claim 1, wherein
the cationic group comprises a substituted or unsubstituted $C_{1-6}$ alkyl ammonium group, a substituted or unsubstituted $C_{1-6}$ alkyl phosphonium group, a substituted or unsubstituted $C_{7-30}$ arylalkyl ammonium group, a chelated metal cation, a substituted or unsubstituted anilinium group, a substituted or unsubstituted pyridinium group, or a substituted or unsubstituted imidazolium group; and
the hydrogen bond donor comprises a hydroxyl group, a carboxylic acid group, an amine group, an aniline group, an amide group, or a thiol group.

5. The electroactive species of claim 3, wherein the electroactive species is a compound of formula (VI), (VII), or (VIII).

6. The electroactive species of claim 5, wherein the electroactive species is a compound of formula (VIII) wherein
c is 0;
d is 4; and
at least one occurrence of $R^b$ is -(L)$_z$-A, wherein
z is 1;
L is a substituted or unsubstituted phenylene group; and
A is
a —$NR^2R^3R^4$ ammonium group, wherein $R^2$, $R^3$ and $R^4$ are independently at each occurrence a substituted or unsubstituted $C_{1-6}$ alkyl group or a substituted or unsubstituted benzyl group, or
a hydroxyl group.

7. The electroactive species of claim 6, wherein
both occurrences of $R^b$ are -(L)$_z$-A, wherein each occurrence of z is 1 and each occurrence of L is a substituted or unsubstituted phenylene group;
A is the —$NR^2R^3R^4$ ammonium group; and
$R^1$ is hydrogen.

8. The electroactive species of claim 6, wherein
A is a hydroxyl group, an amine group, an amide group, or a thiol group; and
$R^1$ is hydrogen.

9. The electroactive species of claim 5, wherein the electroactive species is a compound of formula (VIII) wherein
c is 0;
d is 4;
at least one occurrence of $R^b$ is -(L)$_z$-A wherein
z is 0; and
A is a substituted or unsubstituted pyridinium group or imidazolium group.

10. The electroactive species of claim 5, wherein the electroactive species is a compound of formula (VIII) wherein
c is 2;
d is 2;
$R^b$ is independently at each occurrence hydrogen or a substituted or unsubstituted phenyl group;
$R^x$ is independently at each occurrence -(L)$_z$-A wherein
z is 0; and
A is
a —$NR^2R^3R^4$ ammonium group, wherein $R^2$, $R^3$ and $R^4$ are independently at each occurrence a substituted or unsubstituted $C_{1-6}$ alkyl group or a substituted or unsubstituted benzyl group, or
a hydroxyl group.

11. The electroactive species of claim 3, wherein the electroactive species is a compound of formula (IX).

12. The electroactive species of claim 11, wherein
each occurrence of e is 1,
each occurrence of f is 3,
each occurrence of $R^x$ is -(L)$_z$-A, wherein A is
a —$NR^2R^3R^4$ ammonium group, wherein $R^2$, $R^3$ and $R^4$ are independently at each occurrence a substituted or unsubstituted $C_{1-6}$ alkyl group or a substituted or unsubstituted benzyl group, or
a hydroxyl group, an amine group, an amide group, or a thiol group, preferably a hydroxyl group.

13. The electroactive species of claim 11, wherein the electroactive species is a compound of the formula (IXb)

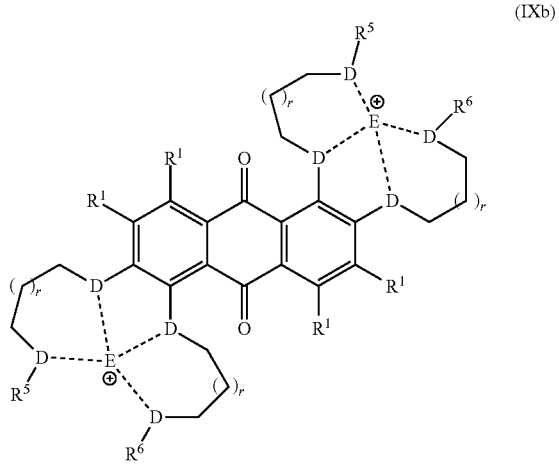

(IXb)

wherein
R[1] is independently at each occurrence hydrogen, halogen, a $C_{1-30}$ alkyl group, a $C_{1-30}$ alkoxy group, a poly($C_{1-30}$ alkylene oxide) group; a $C_{3-30}$ cycloalkyl group, a $C_{3-30}$ branched alkyl group, a $C_{6-30}$ aryl group, a $C_{2-30}$ heteroaryl group, a $C_{1-30}$ fluoroalkyl group, a nitrile group, a nitro group, a thiol group, or a vinyl group;
D is independently at each occurrence oxygen or nitrogen;
r is 0 or 1;
$R^5$ and $R^6$ are independently at each occurrence a $C_{1-6}$ alkyl group, a poly($C_{2-3}$ alkylene oxide) group, or a poly($C_{2-3}$ alkylene diamine) group, wherein $R^5$ is optionally combined with $R^6$ to form a cyclic group; and
E is a metal cation.

14. The electroactive species of claim 13, wherein
$R^1$ is hydrogen;
$R^5$ and $R^6$ are methyl;
D is oxygen or nitrogen; and
r is 0.

15. The electroactive species of claim 13, wherein
$R^1$ is hydrogen;
D is oxygen;
r is 0; and
$R^5$ and $R^6$ are poly(ethylene oxide) groups, wherein $R^5$ and $R^6$ combine to form a cyclic ether.

16. The electroactive species of claim 3, wherein the electroactive species is of formula (X).

17. The electroactive species of claim 16, wherein
A is a —$NR^2R^3R^4$ ammonium group;
z is 0;
$R^1$ is hydrogen;
each occurrence of e is 1; and
each occurrence of f is 3.

18. The electroactive species of claim 16, wherein
A is a hydroxyl group, an amine group, an amide group, or a thiol group;
z is 1;
L is a linking group comprising a $C_6$ arylene group;
$R^1$ is hydrogen;
each occurrence of e is 1; and
each occurrence of f is 3.

19. The electroactive species of claim 1, wherein the stabilizing group A is 10 atoms or less away from at least one ketone group of the electroactive species or wherein the stabilizing group A is 1 to 10 atoms from at least one ketone group of the electroactive species.

20. A polymer or oligomer wherein at least a portion of the repeating units comprise the electroactive species of claim 1.

21. A polymer or oligomer comprising repeating units derived from
a first monomer comprising a polymerizable group and an electroactive species comprising a quinone core structure, and
a second monomer comprising a polymerizable group and a stabilizing group comprising a cationic group, a hydrogen bond donor, or a combination thereof;
wherein the electroactive species comprises
an oxidized state, and
at least one reduced state capable of bonding with a Lewis acid gas to form an anion adduct between the Lewis acid gas and the reduced electroactive species; and
wherein the presence of the stabilizing group:
kinetically favors the forming the anion adduct from the reduced electroactive species and the Lewis acid gas, or
thermodynamically favors forming the anion adduct in a thermodynamic equilibrium between the anion adduct and the reduced electroactive species, or
kinetically favors forming the anion adduct from the reduced electroactive species and thermodynamically favors the forming of the anion adduct in the thermodynamic equilibrium between the anion adduct and the reduced electroactive species.

22. A method for separating a Lewis acid gas from a fluid mixture comprising the Lewis acid gas, the method comprising:
contacting the fluid mixture with the electroactive species of claim 1, wherein the electroactive species is in a reduced state, to form an anion adduct between the Lewis acid gas and the electroactive species in the reduced state.

23. The method of claim 22, wherein the contacting is in the presence of an electrolyte.

24. The method of claim 22, wherein an association constant between the reduced electroactive species comprising the stabilizing group and the Lewis acid gas is greater than an association constant between the reduced electroactive species not including the stabilizing group and the Lewis acid gas.

25. The method of claim 22,
wherein the forming of the anion adduct from the reduced electroactive species comprising the stabilizing group and the Lewis acid gas is kinetically more favorable than forming an anion adduct from the reduced electroactive species not including the stabilizing group and the Lewis acid gas; or
wherein the forming of the anion adduct from the reduced electroactive species comprising the stabilizing group and the Lewis acid gas is thermodynamically more favorable than forming an anion adduct from the reduced electroactive species not including the stabilizing group and the Lewis acid gas; or
wherein the forming of the anion adduct from the reduced electroactive species comprising the stabilizing group and the Lewis acid gas is kinetically and thermodynamically more favorable than forming an anion adduct from the reduced electroactive species not including the stabilizing group and the Lewis acid gas.

26. The method of claim 22, wherein the stabilizing group is a cationic group, and
forming of the anion adduct from the reduced electroactive species comprising the stabilizing group and the Lewis acid gas is kinetically more favorable than forming an anion adduct from a reduced state of a nonionic electroactive species having a reduction potential that is the same as the reduced electroactive species comprising the stabilizing group and the Lewis acid gas; or forming of the anion adduct from the reduced electroactive species comprising the stabilizing group and the Lewis acid gas is thermodynamically more favorable than forming an anion adduct from a reduced state of a nonionic electroactive species having a reduction potential that is the same as the reduced electroactive species comprising the stabilizing group and the Lewis acid gas; or forming of the anion adduct from the reduced electroactive species comprising the stabilizing group and the Lewis acid gas is kinetically and thermodynamically more favorable than forming an anion adduct from a reduced state of a nonionic electroactive species having a reduction potential that is the same as the reduced electroactive species comprising the stabilizing group and the Lewis acid gas.

27. The method of claim 22, wherein the stabilizing group is a hydrogen bond donor, and forming the anion adduct from the reduced electroactive species comprising the stabilizing group and the Lewis acid gas is kinetically more favorable than forming an anion adduct from a reduced state of a nonionic electroactive species having a reduction potential that is the same as the reduced electroactive species comprising the stabilizing group and the Lewis acid gas; or forming of the anion adduct from the reduced electroactive species comprising the stabilizing group and the Lewis acid gas is thermodynamically more favorable than forming an anion adduct from a reduced state of a nonionic electroactive species having a reduction potential that is the same as the reduced electroactive species comprising the stabilizing group and the Lewis acid gas; or forming of the anion adduct from the reduced electroactive species comprising the stabilizing group and the Lewis acid gas is kinetically and thermodynamically more favorable than forming an anion adduct from a reduced state of a nonionic electroactive species having a reduction potential that is the same as the reduced electroactive species comprising the stabilizing group and the Lewis acid gas.

28. The method of claim 22, wherein
the Lewis acid gas is $CO_2$, $COS$, $SO_2$, $SO_3$, $R_2SO_4$, $NO_2$, $NO_3$, $R_3PO_4$, $R_2S$, $RCOOR'$, $RCHO$, $R'_2CO$, $R'NCO$, $R'NCS$, $BR''_3$, $R''_3BO_3$, or a combination thereof, wherein each R is independently hydrogen, $C_{1-12}$ alkyl, $C_{3-12}$ cycloalkyl, $C_{1-12}$ heterocycloalkyl, $C_{6-20}$ aryl, or $C_{1-12}$ heteroaryl;

each R' is independently $C_{1-12}$ alkyl, $C_{3-12}$ cycloalkyl, $C_{1-12}$ heterocycloalkyl, $C_{6-20}$ aryl, or $C_{1-12}$ heteroaryl; and each R" is independently hydrogen, halogen, $C_{1-12}$ alkyl, $C_{3-12}$ cycloalkyl, $C_{1-12}$ heterocycloalkyl, $C_{6-20}$ aryl, or $C_{1-12}$ heteroaryl.

29. An electrochemical apparatus comprising:
a chamber comprising a negative electrode in electronic communication with an electroactive species in a reduced state, and an electrolyte, wherein the chamber is configured to receive a fluid mixture comprising a Lewis acid gas, wherein the electroactive species comprises a quinone core and at least one stabilizing group covalently bound thereto;

wherein the stabilizing group comprises a cationic group, a hydrogen bond donor, or a combination thereof; and wherein the electroactive species comprises
an oxidized state, and
at least one reduced state capable of bonding with a Lewis acid gas to form an anion adduct between the Lewis acid gas and the reduced electroactive species; and wherein the presence of the stabilizing group:
kinetically favors the forming the anion adduct from the reduced electroactive species and the Lewis acid gas, or
thermodynamically favors forming the anion adduct in a thermodynamic equilibrium between the anion adduct and the reduced electroactive species, or
kinetically favors forming the anion adduct from the reduced electroactive species and thermodynamically favors the forming of the anion adduct in the thermodynamic equilibrium between the anion adduct and the reduced electroactive species.

30. An electrochemical apparatus comprising:
a chamber comprising a negative electrode in electronic communication with an electroactive species in a reduced state, and an electrolyte, wherein the chamber is configured to receive a fluid mixture comprising a Lewis acid gas, wherein the electroactive species comprises a polymer or oligomer according to claim 20.

31. An electrochemical apparatus comprising:
a chamber comprising a negative electrode in electronic communication with an electroactive species in a reduced state, and an electrolyte, wherein the chamber is configured to receive a fluid mixture comprising a Lewis acid gas, wherein the electroactive species comprises a polymer or oligomer according to claim 21.

32. A gas separation system, comprising a plurality of electrochemical cells in fluid communication with a gas inlet and a gas outlet, wherein each of the plurality of electrochemical cells comprises:

a first electrode comprising an electroactive species in a reduced state wherein the electroactive species comprises an oxidized state and at least one reduced state which bonds with a Lewis acid gas to form an anion adduct;

a second electrode comprising a complementary electroactive layer;

a first separator between the first electrode and the second electrode; and an electrolyte;

wherein the electroactive species comprises a quinone core and at least one stabilizing group covalently bound thereto;

wherein the stabilizing group comprises a cationic group, a hydrogen bond donor, or a combination thereof; and wherein the presence of the stabilizing group:
kinetically favors the forming the anion adduct from the reduced electroactive species and the Lewis acid gas, or
thermodynamically favors forming the anion adduct in a thermodynamic equilibrium between the anion adduct and the reduced electroactive species, or
kinetically favors forming the anion adduct from the reduced electroactive species and thermodynamically favors the forming of the anion adduct in the thermodynamic equilibrium between the anion adduct and the reduced electroactive species.

33. A gas separation system, comprising a plurality of electrochemical cells in fluid communication with a gas inlet and a gas outlet, wherein each of the plurality of electrochemical cells comprises:
   a first electrode comprising an electroactive species in a reduced state wherein the electroactive species comprises an oxidized state and at least one reduced state which bonds with a Lewis acid gas to form an anion adduct;
   a second electrode comprising a complementary electroactive layer;
   a first separator between the first electrode and the second electrode; and
   an electrolyte;
   wherein the electroactive species comprises a polymer or oligomer according to claim 20.

34. A gas separation system, comprising a plurality of electrochemical cells in fluid communication with a gas inlet and a gas outlet, wherein each of the plurality of electrochemical cells comprises:
   a first electrode comprising an electroactive species in a reduced state wherein the electroactive species comprises an oxidized state and at least one reduced state which bonds with a Lewis acid gas to form an anion adduct;
   a second electrode comprising a complementary electroactive layer;
   a first separator between the first electrode and the second electrode; and
   an electrolyte;
   wherein the electroactive species comprises a polymer or oligomer according to claim 21.

\* \* \* \* \*